United States Patent
Muthler et al.

(10) Patent No.: US 12,469,203 B2
(45) Date of Patent: Nov. 11, 2025

(54) EFFICIENCY OF RAY-BOX TESTS

(71) Applicant: NVIDIA Corporation, Santa Clara, CA (US)

(72) Inventors: Gregory Muthler, Chapel Hill, NC (US); John Burgess, Austin, TX (US); Eric Enderton, Berkeley, CA (US); Nikhil Dixit, Austin, TX (US); Josh Noel, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 399 days.

(21) Appl. No.: 17/946,509

(22) Filed: Sep. 16, 2022

(65) Prior Publication Data

US 2024/0095996 A1 Mar. 21, 2024

(51) Int. Cl.
*G06T 15/06* (2011.01)

(52) U.S. Cl.
CPC .................................. *G06T 15/06* (2013.01)

(58) Field of Classification Search
CPC .. G06T 15/06; G06T 2210/12; G06T 2210/21
See application file for complete search history.

(56) References Cited

U.S. PATENT DOCUMENTS

| | | | |
|---|---|---|---|
| 9,569,559 B2 | 2/2017 | Karras et al. | |
| 9,582,607 B2 | 2/2017 | Laine et al. | |
| 10,025,879 B2 | 7/2018 | Karras et al. | |
| 10,032,289 B2 | 7/2018 | Laine et al. | |
| 10,235,338 B2 | 3/2019 | Laine et al. | |
| 10,242,485 B2 | 3/2019 | Karras et al. | |
| 10,580,196 B1 | 3/2020 | Muthler et al. | |
| 10,740,952 B2 | 8/2020 | Laine et al. | |

(Continued)

OTHER PUBLICATIONS

Wikipedia, Rotation matrix, pp. 26, URL: https://en.wikipedia.org/w/index.php?title=Rotation_matrix&oldid=1038415306 (Year: 2021).*

(Continued)

*Primary Examiner* — Phuc N Doan
(74) *Attorney, Agent, or Firm* — Nixon & Vanderhye P.C.

(57) ABSTRACT

To improve the efficiency of bounding volumes in a hardware based ray tracer, we employ a sheared axis-aligned bounding box to approximate an oriented bounding box typically defined by rotations. To achieve this, the bounding volume hierarchy builder shears an axis-aligned box to fit tightly around its enclosed oriented geometry in top level or bottom level space, then computes the inverse shear transform. The bounds are still stored as axis-aligned boxes in memory, now defined in the new sheared coordinate system, along with the derived parameters to transform a ray into the sheared coordinate system before testing intersection with the boxes. The ray-bounding volume intersection test is performed as usual, just in the new sheared coordinate system. Additional efficiencies are gained by constraining the number of shear dimensions, constraining the shear transform coefficients to a quantized list, sharing a shear transform across a collection of bounds, performing a shear transform only for ray-bounds testing and not for ray-geometry intersection testing, and adding a specialized shear transform calculator/accelerator to the hardware.

26 Claims, 34 Drawing Sheets

(56) References Cited

U.S. PATENT DOCUMENTS

| | | |
|---|---|---|
| 10,810,785 B2 | 10/2020 | Muthler et al. |
| 10,825,230 B2 | 11/2020 | Laine et al. |
| 10,825,232 B2 | 11/2020 | Muthler et al. |
| 10,866,990 B2 | 12/2020 | Lehtinen et al. |
| 10,867,429 B2 | 12/2020 | Laine et al. |
| 10,885,698 B2 | 1/2021 | Muthler et al. |
| 11,113,790 B2 | 9/2021 | Marrs et al. |
| 11,138,009 B2 | 10/2021 | Babich, Jr. et al. |
| 11,157,414 B2 | 10/2021 | Muthler et al. |
| 11,164,360 B2 | 11/2021 | Laine et al. |
| 11,189,075 B2 | 11/2021 | Laine et al. |
| 11,200,725 B2 | 12/2021 | Muthler et al. |
| 11,282,261 B2 | 3/2022 | Muthler et al. |
| 11,295,508 B2 | 4/2022 | Muthler et al. |
| 11,302,056 B2 | 4/2022 | Muthler et al. |
| 11,328,472 B2 | 5/2022 | Laine et al. |
| 2016/0005215 A1* | 1/2016 | Hwang .................. G06T 15/30 345/422 |
| 2016/0070767 A1 | 3/2016 | Karras et al. |
| 2016/0070820 A1 | 3/2016 | Laine et al. |
| 2021/0012552 A1 | 1/2021 | Laine et al. |
| 2021/0390759 A1 | 12/2021 | Muthler et al. |
| 2022/0207690 A1* | 6/2022 | Burns .................. G06T 15/06 |
| 2023/0099806 A1* | 3/2023 | Oldcorn .................. G06T 11/20 345/419 |
| 2023/0206541 A1* | 6/2023 | Saleh .................. G06T 17/10 345/418 |

OTHER PUBLICATIONS

Sjoholm, "Best Practices: Using NVIDIA RTX Ray Tracing", https://developer.nvidia.com/blog/best-practices-using-nvidia-rtx-ray-tracing/ (Aug. 10, 2020).

Lefrançois et al., "DX12 Raytracing tutorial—Part 1" https://developer.nvidia.com/rtx/raytracing/dxr/dx12-raytracing-tutorial-part-1 (2018).

Wyman et al, "Introduction to DirectX Raytracing" In: Haines, E., Akenine-Moller, T. (eds) Ray Tracing Gems. Apress, Berkeley, CA. https://doi.org/10.1007/978-1-4842-4427-2_3; (2019).

Gottshalk et al, OBBTree: A Hierarchical Structure for Rapid Interference Detection, pp. 171-180 SIGGRAPH '96: Proceedings of the 23rd Annual Conference on Computer Graphics and Interactive Techniques, doi.org/10.1145/237170.237244 (Aug. 1996).

Woop, "A Ray Tracing Hardware Architecture for Dynamic Scenes", Universitat des Saarlandes (2004).

* cited by examiner

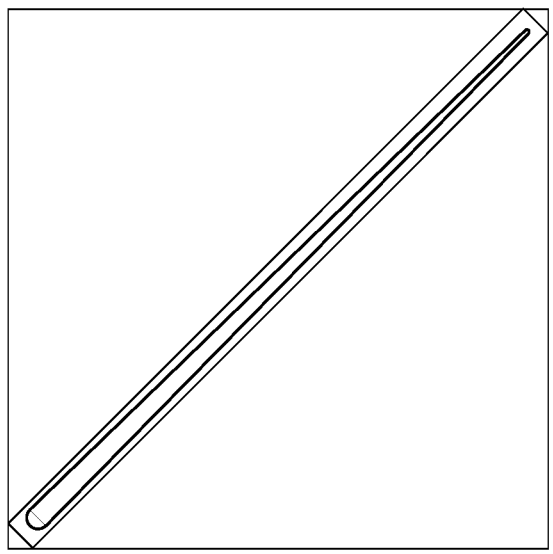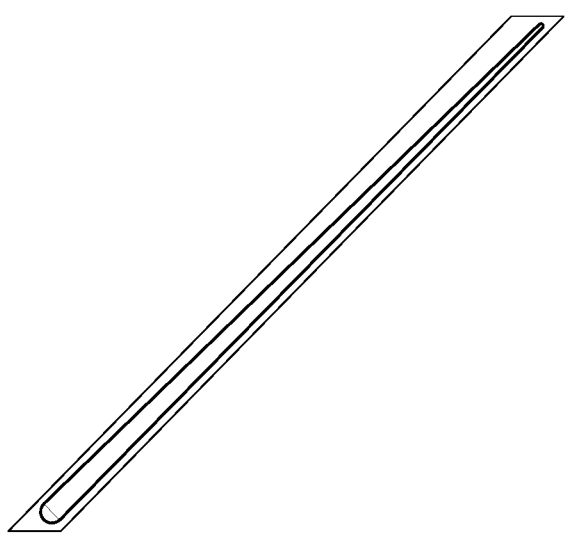
FIG. 3A                    FIG. 3B

Original Object

Shear in X direction

Shear in Y direction

Shear in both directions

FIG. 6B

Example Ray Tracing Shading Pipeline

FIG. 12 TRAVERSAL COPROCESSOR

| shearSelect | | Selected Coefficients | Shear Transform |
|---|---|---|---|
| 0 | 0000 | (A, B) | $x' = x + Ay + Bz$ |
| 1 | 0001 | (C, D) | $y' = Cx + y + Dz$ |
| 2 | 0010 | (E, F) | $z' = Ex + Fy + z$ |
| 3 | 0011 | (B, D) | $x' = x + Bz$ <br> $y' = y + Dz$ |
| 4 | 0100 | (C, E) | $y' = Cx + y$ <br> $z' = Ex + z$ |
| 5 | 0101 | (A, F) | $x' = x + Ay$ <br> $z' = Fy + z$ |
| 8 | 1000 | (A) | $x' = x + Ay$ |
| 9 | 1001 | (B) | $x' = x + Bz$ |
| 10 | 1010 | (C) | $y' = Cx + y$ |
| 11 | 1011 | (D) | $y' = y + Dz$ |
| 12 | 1100 | (E) | $z' = Ex + z$ |
| 13 | 1101 | (F) | $z' = Fy + z$ |

FIG. 14

| shearCoeff | | Coefficient Value |
|---|---|---|
| 0 | 0000 | 1/8 |
| 1 | 0001 | 1/4 |
| 2 | 0010 | 3/8 |
| 3 | 0011 | 1/2 |
| 4 | 0100 | 5/8 |
| 5 | 0101 | 3/4 |
| 6 | 0110 | 7/8 |
| 7 | 0111 | 1 |
| 8 | 1000 | - 1/8 |
| 9 | 1001 | - 1/4 |
| 10 | 1010 | - 3/8 |
| 11 | 1011 | - 1/2 |
| 12 | 1100 | - 5/8 |
| 13 | 1101 | - 3/4 |
| 14 | 1110 | - 7/8 |
| 15 | 1111 | -1 |

FIG. 15

TTU Processing

Example Process To Generate an Image

EFFICIENCY OF RAY-BOX TESTS

CROSS-REFERENCE TO RELATED PATENTS AND APPLICATIONS

This application is related to U.S. Pat. No. 11,295,508 entitled Hardware-Based Techniques Applicable For Ray Tracing For Efficiently Representing And Processing An Arbitrary Bounding Volume.

FIELD

The present technology relates to computer graphics, and more particularly, to hardware acceleration of computer graphics processing including but not limited to hardware based real time or close to real time ray and path tracing. The example non-limiting technology herein further provides methods and systems for improving the efficiency of ray-box tests for bounded geometry using oriented bounding volumes, and in particular, sheared axis-aligned bounding boxes. The technology herein further relates to performing per-complet (compressed treelet), localized shear transforms before performing ray-box tests to create tighter fitting bounding volumes and thereby reduce false positive intersections.

BACKGROUND & SUMMARY

Real time computer graphics have advanced tremendously over the last few decades. With the development in the 1980's of powerful graphics processing units (GPUs) providing 3D hardware graphics pipelines, it became possible to produce 3D graphical displays based on texture-mapped polygon primitives in real time response to user input. Such real time graphics processors were built upon a technology called scan conversion rasterization, which is a means of determining visibility from a single point or perspective. Using this approach, three-dimensional objects are modelled from surfaces constructed of geometric primitives, typically polygons such as triangles. The scan conversion process establishes and projects primitive polygon vertices onto a view plane and fills in the points inside the edges of the primitives. See e.g., Foley, Van Dam, Hughes et al, Computer Graphics: Principles and Practice (2d Ed. Addison-Wesley 1995 & 3d Ed. Addison-Wesley 2014).

Hardware has long been used to determine how each polygon surface should be shaded and texture-mapped and to rasterize the shaded, texture-mapped polygon surfaces for display. Typical three-dimensional scenes are often constructed from millions of polygons. Fast modern GPU hardware can efficiently process many millions of graphics primitives for each display frame (every $1/30^{th}$ or $1/60^{th}$ of a second) in real time response to user input. The resulting graphical displays have been used in a variety of real time graphical user interfaces including but not limited to augmented reality, virtual reality, video games and medical imaging. But traditionally, such interactive graphics hardware has not been able to accurately model and portray reflections and shadows.

There is another graphics technology which does perform physically realistic visibility determinations for reflection and shadowing. It is called "ray tracing". Ray tracing refers to casting a ray into a scene and determining whether and where that ray intersects the scene's geometry. This basic ray tracing visibility test is the fundamental primitive underlying a variety of rendering algorithms and techniques in computer graphics. Ray tracing was developed at the end of the 1960's and was improved upon in the 1980's. See e.g., Appel, "Some Techniques for Shading Machine Renderings of Solids" (SJCC 1968) pp. 27-45; Whitted, "An Improved Illumination Model for Shaded Display" Pages 343-349 Communications of the ACM Volume 23 Issue 6 (June 1980); and Kajiya, "The Rendering Equation", Computer Graphics (SIGGRAPH 1986 Proceedings, Vol. 20, pp. 143-150). Since then, ray tracing has been used in non-real time graphics applications such as design and film making. Anyone who has seen "Finding Dory" (2016) or other Pixar animated films has seen the result of the ray tracing approach to computer graphics—namely realistic shadows and reflections. See e.g., Hery et al, "Towards Bidirectional Path Tracing at Pixar" (2016).

Generally, ray tracing is a rendering method in which rays are used to determine the visibility of various elements in the scene. Ray tracing is a primitive used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using the raster based real time 3D graphics technology that has been implemented over the last thirty years. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software can evaluate a material shading function corresponding to what was hit—which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. Ray tracing technology thus allows a graphics system to develop physically correct reflections and shadows that are not subject to the limitations and artifacts of scan conversion techniques.

Ray tracing has been used together with or as an alternative to rasterization and z-buffering for sampling scene geometry. It can also be used as an alternative to (or in combination with) environment mapping and shadow texturing for producing more realistic reflection, refraction and shadowing effects than can be achieved via texturing techniques or other raster "hacks". Ray tracing may also be used as the basic primitive to accurately simulate light transport in physically-based rendering algorithms such as path tracing, photon mapping, Metropolis light transport, and other light transport algorithms.

The main challenge with ray tracing in the past has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step. All the pixels falling between the edges of the triangle are assumed to be the same material running the same shader and fetching adjacent groups of texels from the same textures.

In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with rasterizing texture mapped, shaded triangles is not present (e.g., a common vantage point, window and image plane are not there for ray tracing). This makes ray tracing much more computationally challenging than other graphics approaches—and therefore much more difficult to perform on an interactive real time basis.

However, after many decades of hard work, NVIDIA and other hardware manufacturers are now offering hardware that makes real time or near real time ray and path tracing a reality. Right now a growing number of video games are partially ray traced. They combine traditional rasterization-based rendering techniques with some ray-tracing effects. Rasterization is equivalent to casting one set of rays from a single point that stops at the first thing they hit. Ray tracing takes this further, casting rays from many points in any direction. And a technique known as path tracing can use ray tracing as one component of a larger light simulation system to simulate the true physics of light. See Kajiya, cited above. In one example of path tracing, all lights in a scene are sampled stochastically—using Monte Carlo or other techniques—both for direct illumination, to light objects or characters, and for global illumination, to light rooms or environments with indirect lighting. To do that, rather than tracing a ray back through one bounce, rays would be traced over multiple bounces (just as real light behaves), back to their light sources. The results are extremely realistic but the underlying ray tracing processes substantially increase the number of rays that need to be cast into the scene and tested for intersection with geometry in the scene—placing a premium on ever more efficient ray-geometry intersection testing.

Acceleration Structures (ASes)

A basic task for most ray tracers is to test a ray against all primitives (e.g., geometry such as polygons, or procedural primitives in some implementations) in the scene and report either the closest hit (according to distance measured along the ray) or simply the first (not necessarily closest) hit encountered, depending upon use case. The naïve algorithm would be an O(n) brute-force search. However, due to the large number of primitives in a 3D scene of arbitrary complexity and the ray path divergence mentioned above, it usually is not efficient or feasible for a ray tracer to test every geometric primitive in the scene for an intersection with each of a potentially very large number of rays. Some way to narrow the scope of the intersection testing was needed.

It was found that by pre-processing the scene geometry and building a suitable acceleration data structure (also known as an acceleration structure or AS) in advance, it became possible to reduce the average-case complexity to O(log n). Such ASes provide spatial or object hierarchies used by the ray tracing traversal algorithm to efficiently search for primitives that potentially intersect a given ray.

The AS most commonly used by modern ray tracers is a bounding volume hierarchy (BVH) comprising nested axis-aligned bounding boxes (AABBs). Advantages of using axis-aligned bounding boxes include efficient storage (a bounding box can be specified by only two coordinates since the directions of all of its axes are implied by the directions of the coordinate system axes) and calculation efficiency. See e.g., U.S. Pat. Nos. 10,331,632; 10,032,289; 8,411,088. The leaf nodes of the BVH contain the geometric or other primitives (e.g., triangles) to be tested for intersection. The BVH is most often represented by a graph or tree structure data representation. AABB bounding volume hierarchies (BVHs) of the type commonly used for modern ray tracing acceleration data structures typically have an O(log n) search behavior—much better than the O(n) brute-force search.

The BVH acceleration data structure represents and/or references the 3D model of an object or a scene in a manner that will assist in quickly deciding which portion of the object a particular ray is likely to intersect and quickly rejecting large portions of the scene the ray will not intersect. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one kind of BVH, leaf nodes can potentially overlap other leaf nodes.

FIGS. 1A-1C illustrate ray tracing intersection testing in the context of a BVH providing a bounding volume 310 that bounds geometric mesh 320. FIG. 1A shows a ray 302 in a virtual space including bounding volumes 310 and 315. To determine whether the ray 302 intersects geometry in the mesh 320, each geometric primitive (e.g., triangle) could be directly tested against the ray 302. But to accelerate the process (since the object could contain many thousands of geometric primitives), the ray 302 is first tested against the bounding volumes 310 and 315. If the ray 302 does not intersect a bounding volume, then it cannot intersect any geometry inside of the bounding volume and all geometry inside the bounding volume can be ignored for purposes of that ray. Because in FIG. 1A the ray 302 misses bounding volume 310, any geometry of mesh 320 within that bounding volume is not tested for intersection.

While bounding volume 315 is intersected by the ray 302, bounding volume 315 does not contain any geometry and so again, no further testing is required.

On the other hand, if a ray such as ray 304 shown in FIG. 1B is determined to intersect a bounding volume 310 that contains geometry, then the ray might or might not intersect the geometry inside of the bounding volume. Further tests need to be performed on the geometry itself to find possible intersections. Because the rays 304, 306 in FIGS. 1B and 1C, respectively intersect a bounding volume 310 that contains geometry, further tests need to be performed to determine whether any (and which) primitives inside of the bounding volumes are intersected by the rays.

In FIG. 1B, further testing of the intersections with the primitives would indicate that even though the ray 304 passes through the bounding volume 310, it does not intersect any of the geometry the bounding volume encloses (alternatively, as mentioned above, bounding volume 310 could be further volumetrically subdivided so that a bounding volume intersection test could be used to reveal that the ray does not intersect any geometry or more specifically which geometric primitives the ray may intersect). In the FIG. 1B case, further testing will reveal that ray 304 misses all the geometry 320 so that no interaction between the ray and the geometry will contribute to visualization—but the ray is also not occluded by the geometry and so can continue on its way to possibly impinge on additional geometry in the scene.

FIG. 1C shows a situation in which the ray intersects bounding volume 310 that contains geometry 320 which ray 306 intersects. To perform real time ray tracing, an intersection tester will generally test each geometric primitive within the intersected bounding volume 310 to determine whether the ray intersects that geometric primitive and/or which primitive is spatially the "first" one the ray intersects.

Thus, ray tracing algorithms often use bounding volume hierarchies (BVHs) to accelerate ray traversal queries, and typical BVHs use axis-aligned bounding boxes (AABBs) as bounding volumes because they decently bound most geometry and are fast to intersect. Essentially, a bounding volume is used to approximate the space an object occupies for a first, efficient test—and if a more precise understanding beyond an approximation is required, the object itself is then inspected to determine what space it occupies. Often, to increase efficiency and performance, a simple volume (such as an axis-aligned bounding box or AABB) is used as a bounding volume to approximate the space occupied by an object for this first test. This AABB bounding volume can be specified compactly because all of its directions correspond to the axes of the coordinate system in which it is defined. But suppose the geometry does not fit the bounding volume well. Depending on the geometry, the AABB may need to be very large to contain it. That causes a lot of space that is not occupied by any geometry to be included in the AABB. When geometry does not fit well, there can be false hits that lead to extra work.

AABBs do not bound all types of geometry efficiently. In particular, long skinny triangles and strand-like objects (e.g., hair) that are not axis-aligned are not efficiently bound by AABBs. See FIGS. 1D, 1E for examples. As a result, AABBs around these types of objects produce more false positives during ray traversal, significantly reducing traversal performance. In particular, one can see in FIGS. 1D and 1E that much of the volume within each axis aligned bounding box is empty space—largely due to inconvenient or unfortunate misalignment of the object relative to the axes of the space in which the bounding box is defined.

In example hardware-accelerated ray tracing implementations, a hardware unit such as a "Tree Traversal Unit" (TTU) accelerates ray tracing queries, externally known as the RTCore (see FIG. 12). During ray traversal, the TTU performs ray bounding box intersection tests in the Ray Complet Test (RCT) sub-unit using low-precision AABBs stored in a compressed treelet (complet). Rays that intersect a complet child's bounding box are then further tested against the geometry bounded by the child. Depending on the ray, the child's bounding box, and the underlying geometry, it is possible for a ray to intersect a child's bounding box but to miss all the geometry bounded by that child. These events are RCT false positives, which are undesirable as they occupy hardware resources for geometry that is ultimately determined to be missed by the ray(s).

Due to the axis-aligned nature of AABBs, geometry that is not aligned to one of the axes of the box is not bound as tightly as geometry that is axis-aligned. FIGS. 2A and 2A-1 show examples. FIG. 1A shows a long skinny triangle that is aligned to the axes of the space defining the bounding box, resulting in a very close fit. There is not much extra space within the FIG. 2A bounding box beyond the space occupied by the triangle object. Rather, the bounding box is a good approximation of the volume within the object. This means a ray that intersects the bounding box is likely also to intersect the triangle object, so that performing a ray-geometry intersection test on a ray that intersects the FIG. 2A bounding volume is likely to be fruitful and useful.

Compare however the FIG. 2A-1 example. Here, the very same long skinny triangle of FIG. 2A has now been misaligned relative to the AABB axes. Now, most of the volume within the bounding box is empty space, and the bounding box is no longer a good approximation of the volume within the object. As a result, non-axis-aligned geometry yields more RCT false positives and consequently has lower traversal efficiency compared to axis-aligned geometry. The loss of efficiency is even more prevalent for thin, strand-like geometry such as FIG. 1D shows, which is rarely axis-aligned and intrinsically creates more empty space due to its low surface area.

Previous Solution—Instanced Ray Traversal

A previous solutions to this problem may use one or more levels of instancing to transform the geometry into a reference frame that is more suitable for axis-aligned bounding boxes. For example, in 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010); see https://developer.nvidia.com/rtx/ray-tracing/optix. In addition to improvements in APIs (application programming interfaces), one of the advances provided by OptiX™ was improving the ASes used for finding an intersection between a ray and the scene geometry. OptiX™ provides a number of different AS types that the application can choose from. Each AS in the node graph could be a different type, allowing combinations of high-quality static structures with dynamically updated ones.

One of the challenges of constructing ASes is to make them memory-efficient. OptiX™ therefore also provided for "instancing"—namely low-overhead replication of scene geometry by referencing the same data more than once, without having to copy heavyweight data structures. Nodes in the AS graph could be referenced multiple times, which naturally implemented instancing. It was considered desirable not only to share geometry information among instances, but also to share ASes as well.

To support such instancing, Microsoft DXR and other rendering specifications divide the AS into a two-level tree:
- an instance AS (IAS), also known as a top-level acceleration structure (TLAS), contains a set of instanced references to . . .
- geometry ASes (GASes), also known as a bottom-level acceleration structure (BLAS).

The BLAS contains geometric or procedural primitives. The BLAS thus holds the actual vertex data (i.e., geometry) of each object in the scene. The top-level AS (TLAS) defines bounding volumes that contain one or more bottom-level structures. For each BLAS, the top-level AS will define a bounding volume that contains the instances of the geometry the BLAS specifies, each one with its own transformation matrix between the object space coordinate system of the geometry and the world space coordinate system of the scene. This allows geometry instancing and reuse by inserting the same GAS into the TLAS multiple times, each with different transformation matrices. See e.g., Sjoholm, "Best Practices: Using NVIDIA RTX Ray Tracing" (Aug. 10, 2020), https://developer.nvidia.com/blog/best-practices-using-nvidia-rtx-ray-tracing/; https://d eveloper.nvidia.com/rtx/raytracing/dxr/dx12-raytracing-tutorial-part-1; Wyman et al, "Introduction to DirectX Raytracing" In: Haines, E., Akenine-Möller, T. (eds) Ray Tracing Gems. Apress, Berkeley, CA. https://doi.org/10.1007/978-1-4842-4427-2_3 (2019).

Geometry replicated several or many times in the scene at different positions, orientations and scales can thus be represented in the scene as IAS instance nodes. These IAS instance nodes do not explicate geometry, but instead associate a bounding box and leaf node in the world space BVH with a transformation that can be applied to the world-space ray to transform it into an object coordinate space, and a pointer to an object-space GAS. The instance transform increases efficiency by transforming the ray into object space instead of requiring the geometry to be transformed into world (ray) space, and is also compatible with additional, conventional rasterization processes that graphics processing performs to visualize the primitives.

While instancing is a highly useful technique that can lead to great efficiencies, this solution incurs a storage cost to encode the instance, as well as a significant performance cost to execute the instance transform(s). Therefore, it is useful to explore other techniques that may be used instead of or in combination with instancing to provide more efficient bounding volume definitions for certain types of geometry.

Another Solution—Multi-Box

Another solution, known as multi-box in previous generations, uses multiple overlapping boxes around non-oriented geometry to improve the overall bounding efficiency (FIG. 2B). See U.S. Pat. No. 11,295,508. The more boxes used, the better the bounding efficiency (FIG. 2C) but at the cost of more storage.

In more detail, this solution constructs an AABB AS using complets that are wide, allowing multiple (e.g., up to 12 in some embodiments) bounding volume children to be tested simultaneously—and then extends the complet concept with a Multi-Box complet format that allows a single child to have multiple bounding volumes (e.g., AABBs) associated with it, where a "hit" (positive result of a ray-bounding volume intersection test) on any positive number (one or more) of those bounding volumes is treated as a single "hit" or intersection for that child. In other words, the traditional ray-bounding volume intersection test is in appropriate cases (i.e., cases where bounding the geometry doesn't fit the AABB bounding volumes well) explicated to test (e.g., in parallel within a single cycle in some embodiments) a plurality of bounding volumes (all of which can be AABBs) instead of a single bounding volume. Those plurality of AABB bounding volumes can be positioned, sized and oriented to more closely enclose such geometry than any single AABB could. The plurality of bounding volumes (e.g., one bounding volume for each instance in one application) can have the same sizes and/or shapes and/or orientation or different sizes and/or shapes and/or orientations. They can be connected, overlapping or disjoint.

While the Multi-Box approach, either alone or in combination with instanced ray-box intersection testing, is also quite successful for various types of geometry, this solution incurs a storage cost for each additional bounding box, which is potentially significant for large numbers of boxes. Here it can literally be said that "no one size fits all", and further solutions are desirable that can be used instead of or in combination with the multi-box approach.

Another Solution—Oriented Bounding Boxes

Another solution uses oriented bounding boxes (OBBs) instead of axis-aligned bounding boxes as bounding volumes. OBBs are not restricted to any axis and can thus bound non-axis-aligned geometry as tightly as axis-aligned geometry (FIG. 3A). However, a ray-OBB test is more complex and so requires significantly more math data path area, storage cost to define the OBB, and potentially lower performance than ray-AABB tests because of that complexity and storage. Additionally, rotating an AABB representation into an oriented representation is generally thought of as being computationally very expensive (for example, it generally requires a full 3×4 matrix transform multiplied by two vectors to rotate a bounding box into a different set of axes). See e.g., Gottshalk et al, OBBTree: A Hierarchical Structure For Rapid Interference Detection, Pages 171-180 SIGGRAPH '96: Proceedings of the 23rd annual conference on Computer graphics and interactive techniques (August 1996), doi.org/10.1145/237170.237244; Kallberg, "Fast Computation of Tight Fitting Bounding Boxes", Chapter 1 in Lengyel, Game Engine Gems 2 (CRC Press 2011). Thus, while the OBB approach may be useful in some applications, in many implementations it may be desirable to avoid the additional calculation complexity and storage costs of OBBs—especially for real time or near real time hardware-accelerated ray tracing implementations.

Given the great potential of a truly interactive real time ray tracing graphics processing system for rendering high quality images of arbitrary complexity in response for example to user input, further work is possible and desirable.

In particular, it would be highly desirable to further increase ray tracing efficiency and improve performance by providing a mechanism(s) that enables orientation of bounding volumes for ray tracing, collision detection and other applications while reducing or eliminating the above constraints.

BRIEF DESCRIPTION OF THE DRAWINGS

FIG. 2A-1 shows how geometry that is non-axis-aligned cannot be bound as tightly due to the axis-aligned nature of the bounding box.

FIG. 3A shows how an oriented bounding box can bound non-axis-aligned geometry much more tightly than an axis-aligned bounding box.

FIG. 3B shows how a sheared axis-aligned bounding box can approximate the ideal oriented bounding box.

FIGS. 4-1 through 4-6 are together a flip chart animation of a physical example of a shear transform (use a page down button on your browser to advance from one Figure to the next and view the animation).

FIG. 6B shows the IEEE 754 single-precision floating-point representation of the number 1. IEEE 754 floating-point encodes decimal numbers in scientific notation-like format with a base of 2. For example, the bits in this diagram can be interpreted as:

$$(-1)^S * 1.\text{fraction} * 2^{(Exponent-127)} = (-1)^0 * 1.0 * 2^{(127-127)} = 1*1*1 = 1$$

Figure 7:
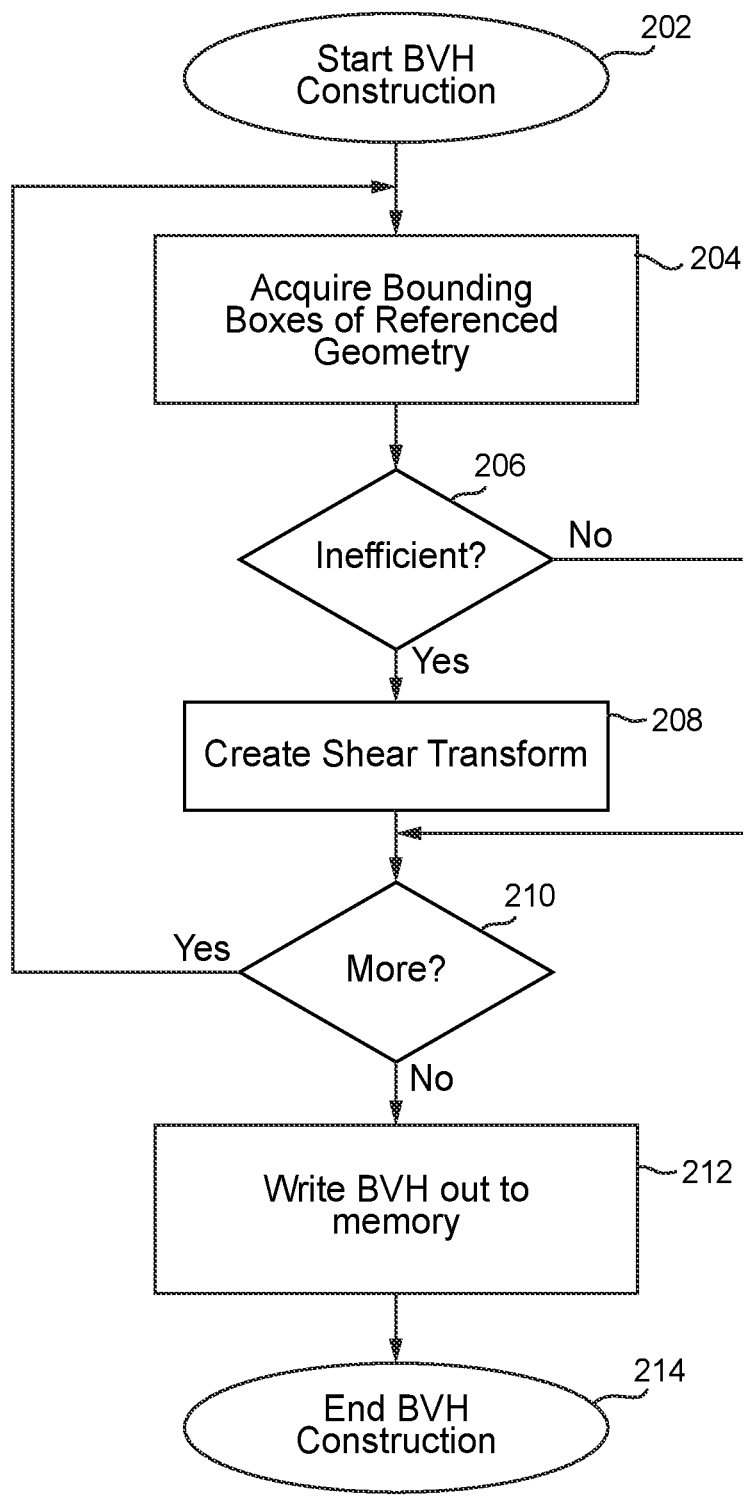

FIG. 7 is a flowchart of an example non-limiting acceleration structure build process.

Figure 7A:
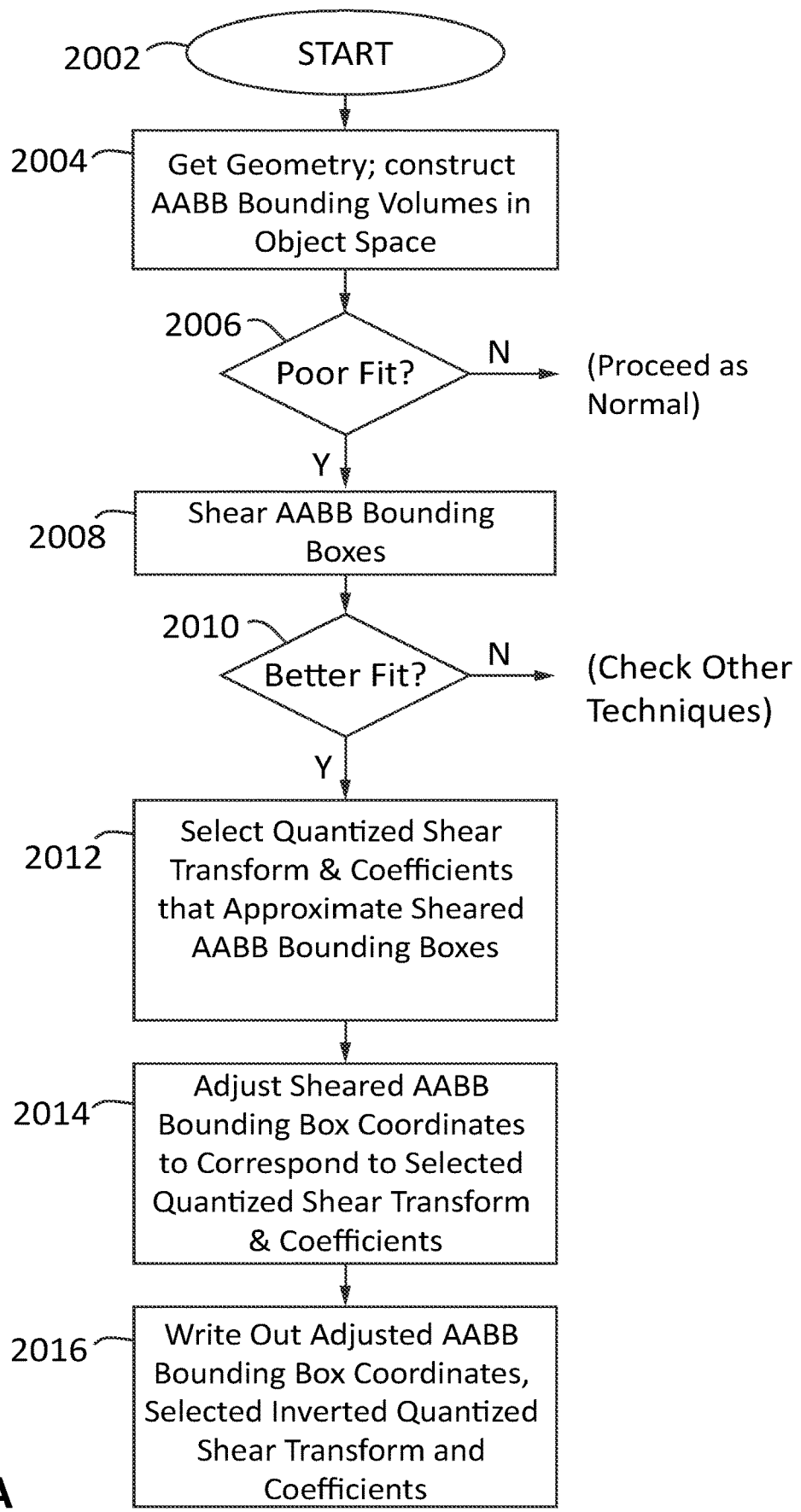

FIG. 7A shows an example non-limiting BVH builder process.

Figure 8A:
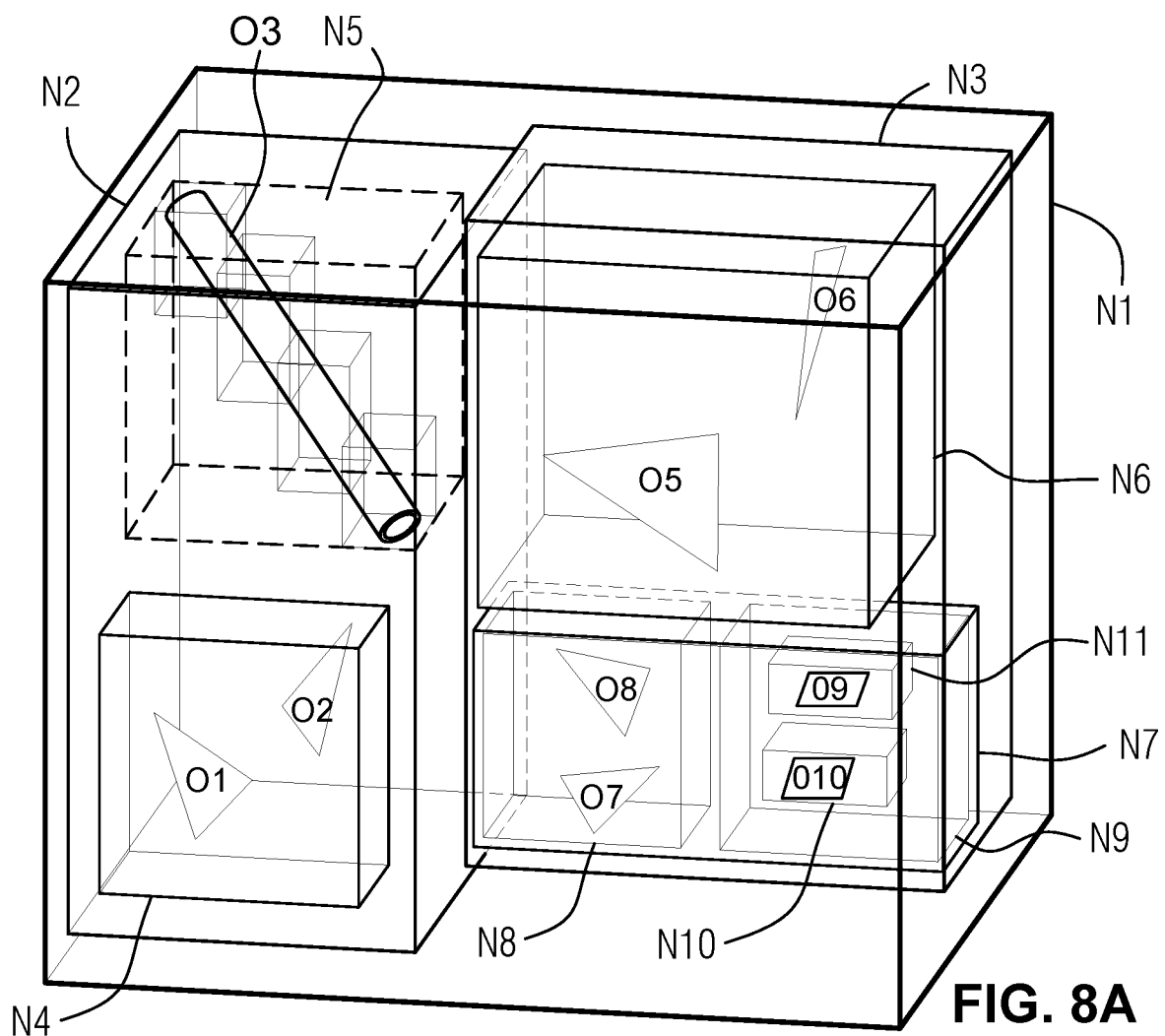
Figure 8B:
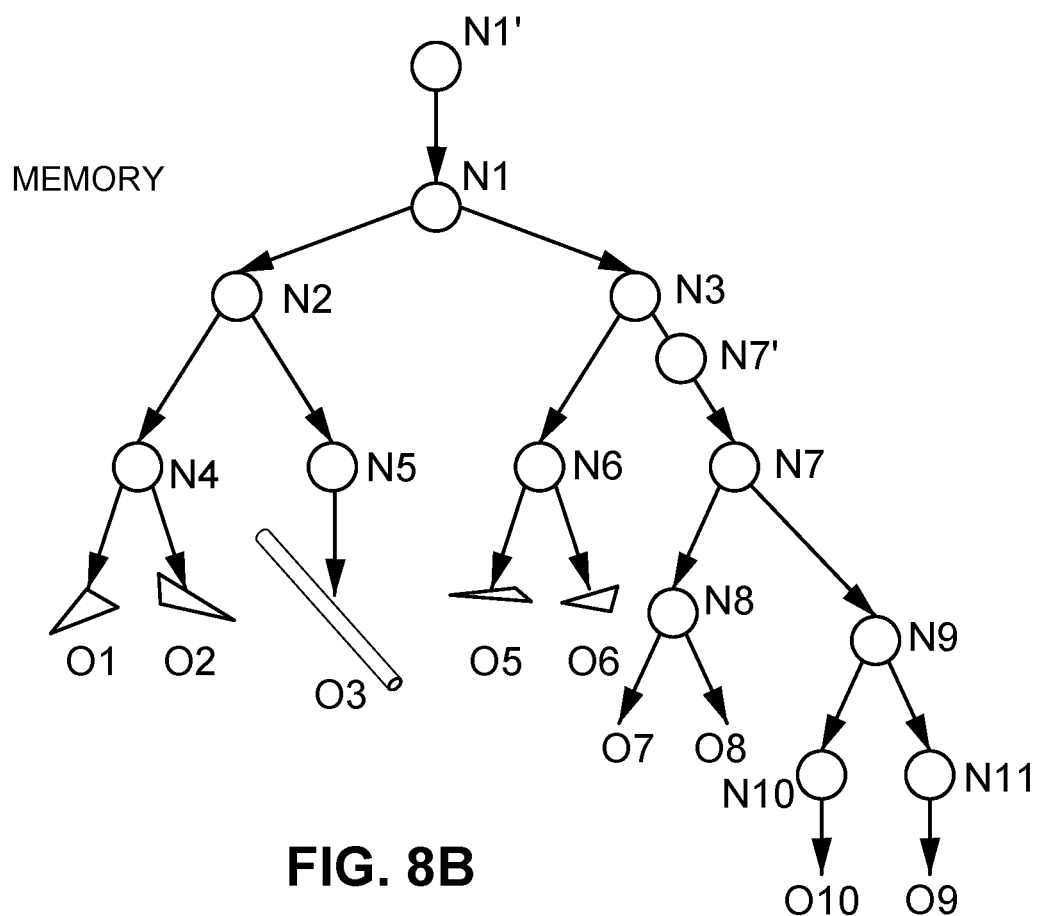

FIGS. 8A and 8B show example bounding volume hierarchy representations.

Figure 9:
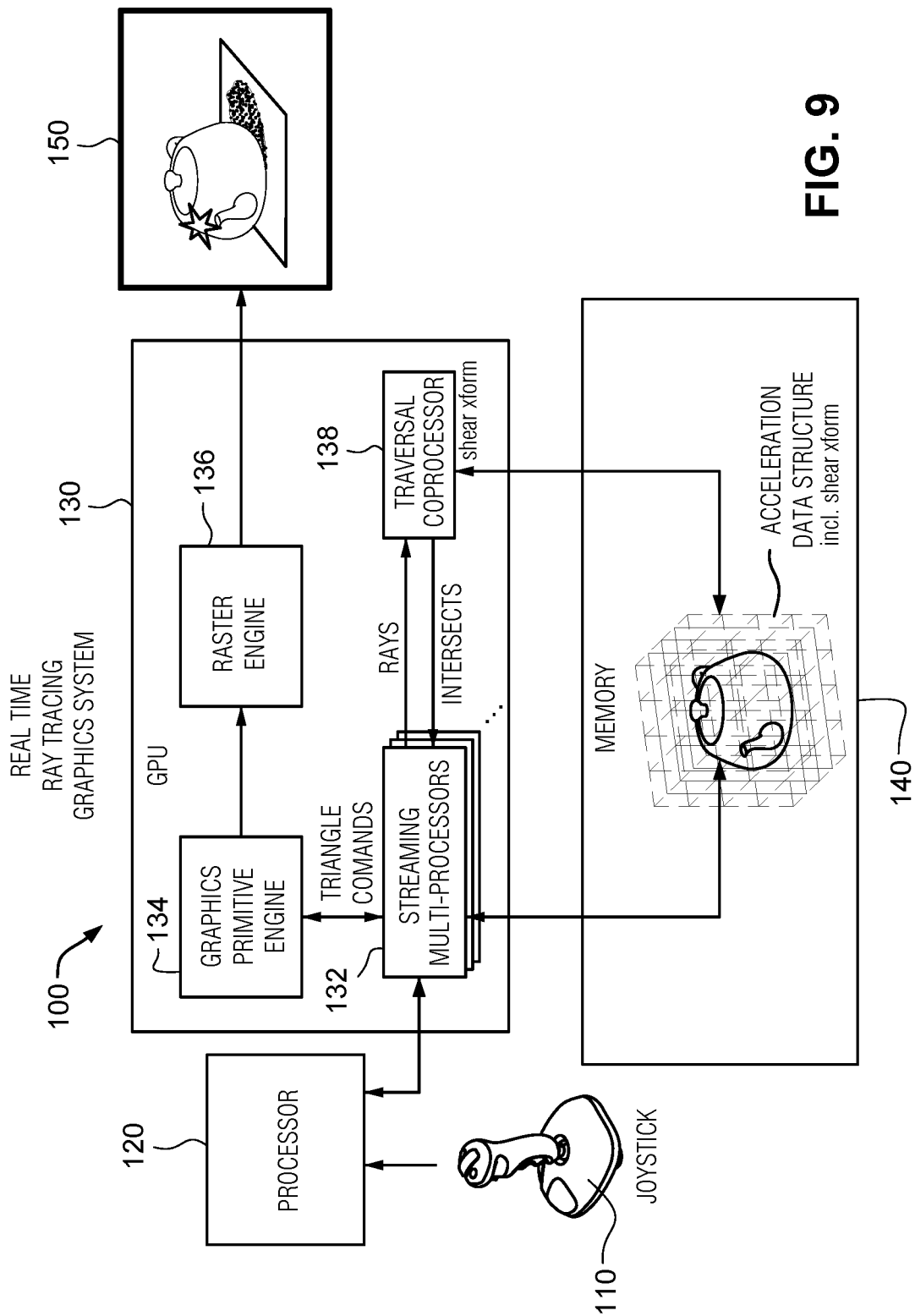

FIG. 9 illustrates an example non-limiting ray tracing graphics system.

Figure 10:
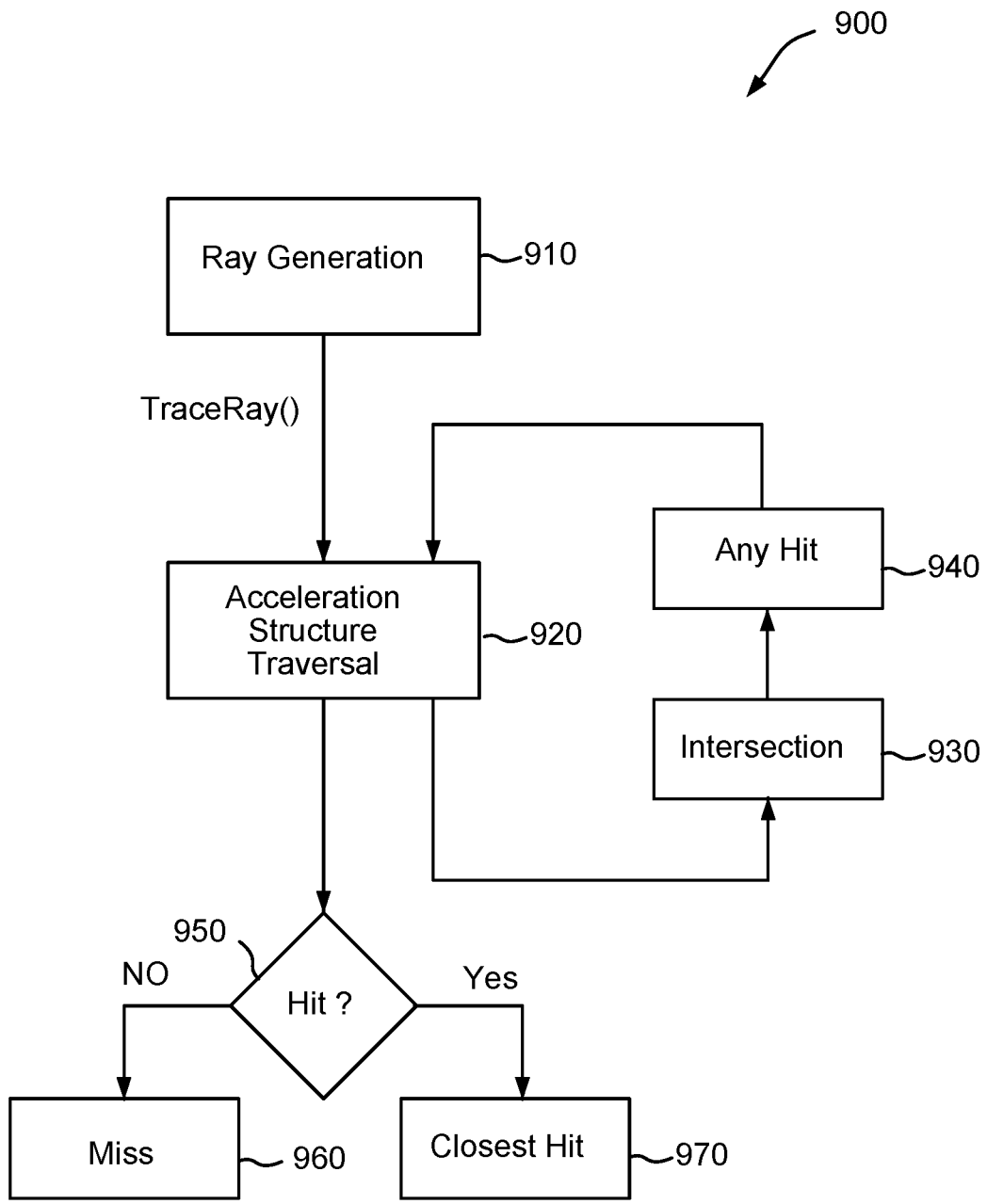

FIG. 10 is a flowchart of an example non-limiting ray tracing graphics pipeline.

Figure 11:
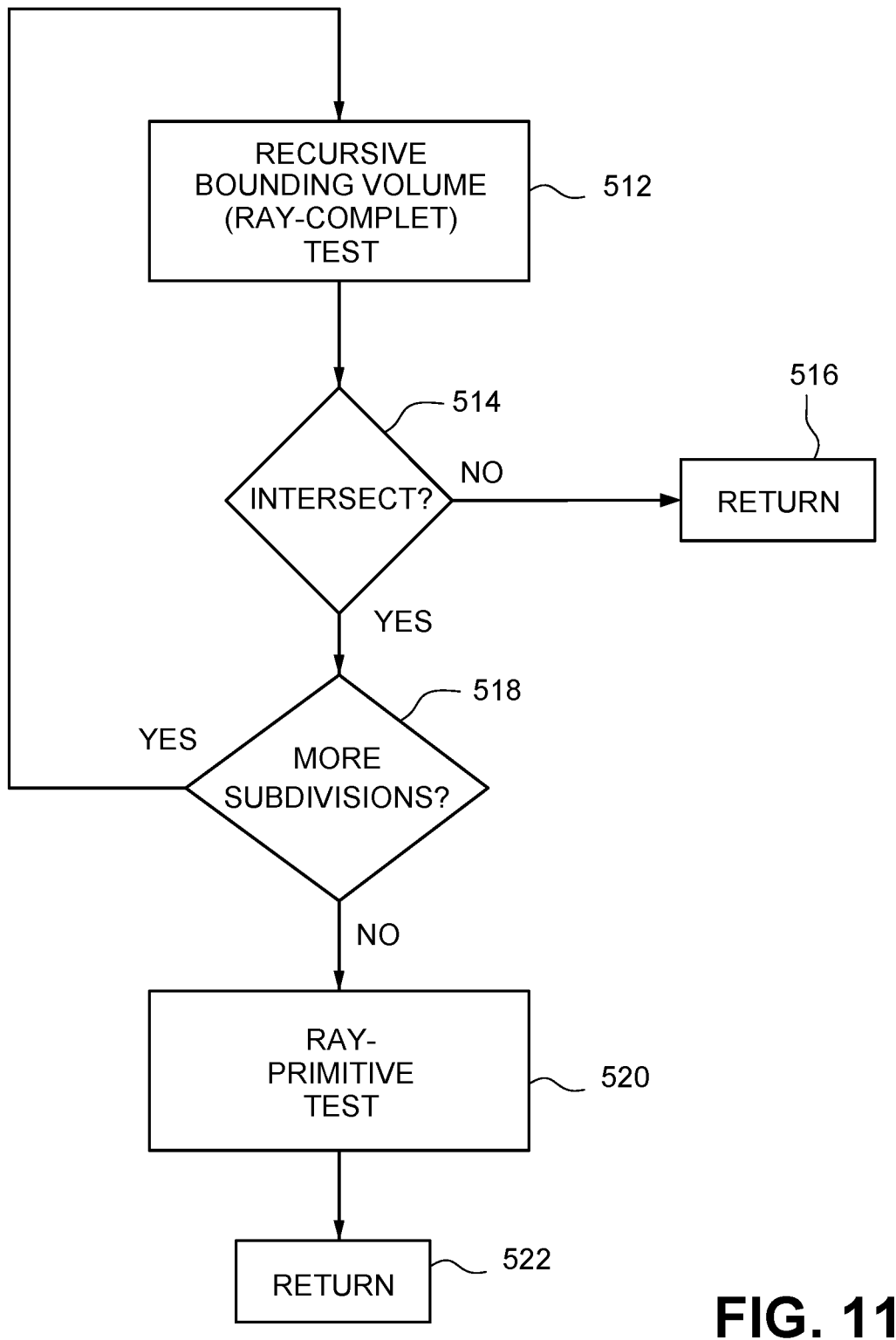

FIG. 11 is a flowchart of example non-limiting hardware based ray tracing operations.

Figure 12:
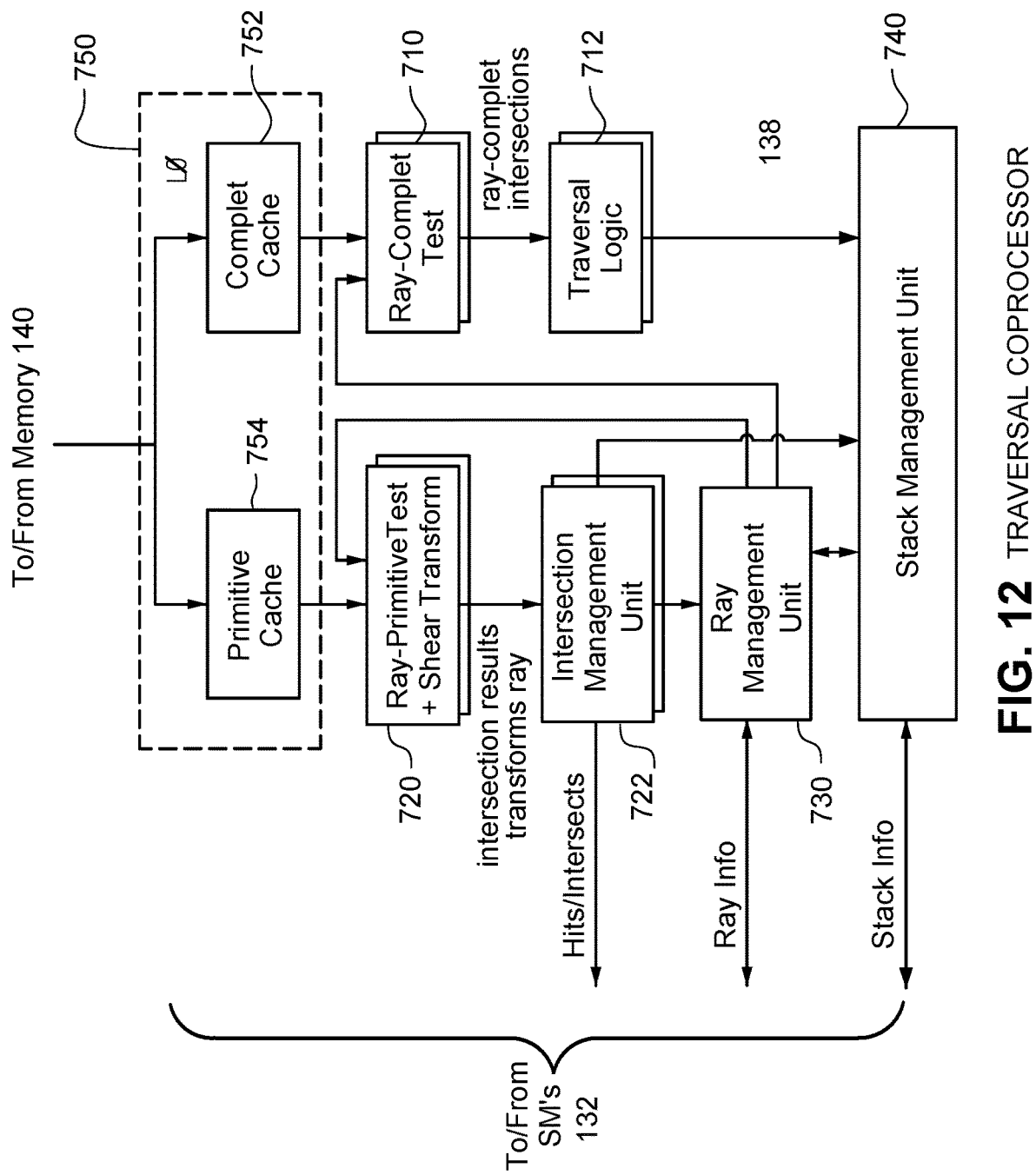

FIG. 12 shows a simplified example non-limiting traversal co-processor comprising a tree traversal unit (TTU).

Figure 13:
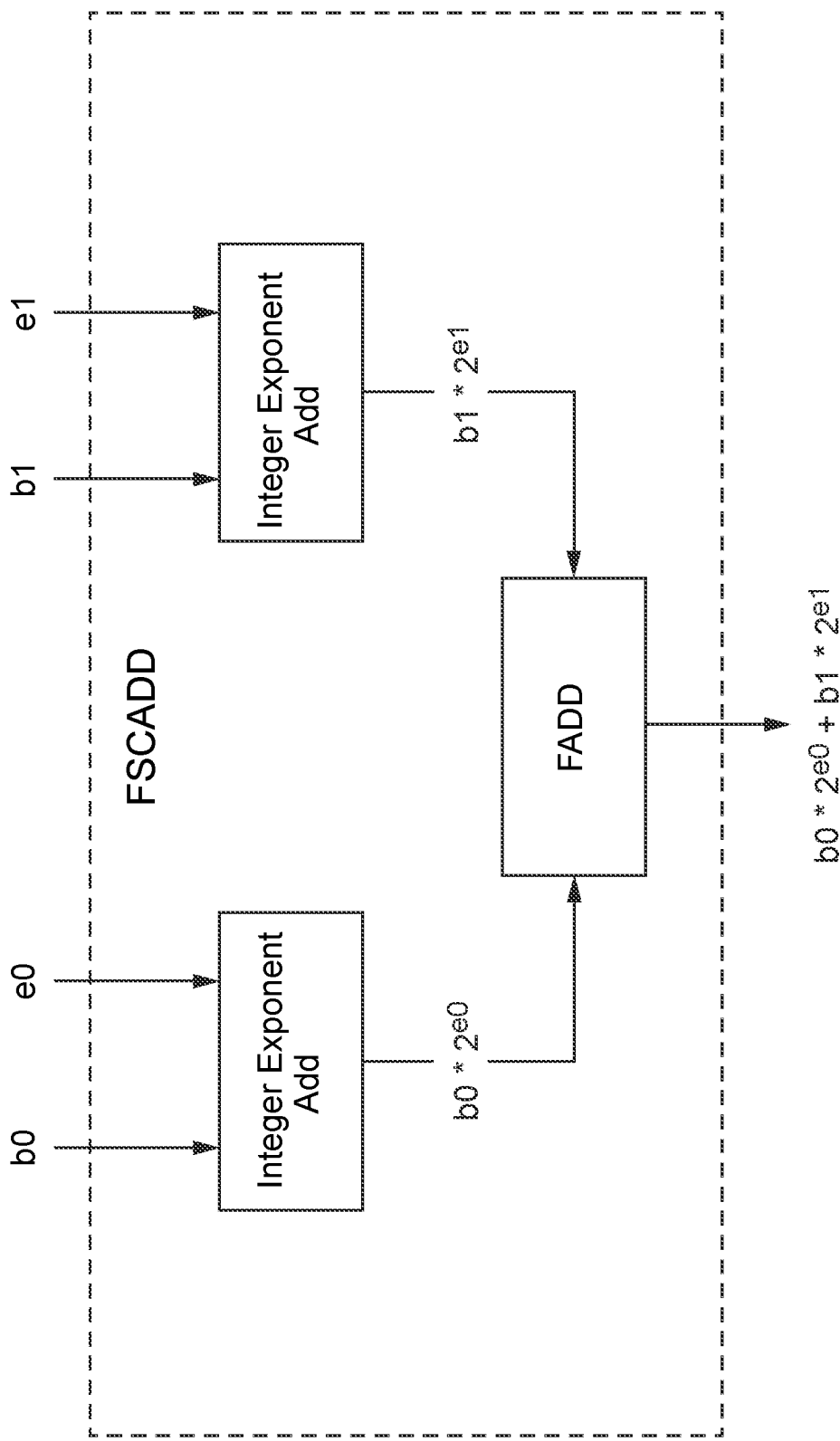

FIG. 13 is a block diagram of an example floating-point scaled add (FSCADD) unit. Scaling by $2^N$ for each input is performed by integer exponent adds. A standard floating-point add (FADD) unit is used to perform the final addition.

FIG. 14 shows an example mapping of the shearSelect input to the selected shear coefficients and the resulting shear transform. Single-coefficient shear transforms are explicitly encoded.

FIG. 15 shows an example mapping of the shearCoeff input to the numerical shear coefficient value. There are up-to 2 shear coefficients for a single shear transform in this particular example.

Figure 16:
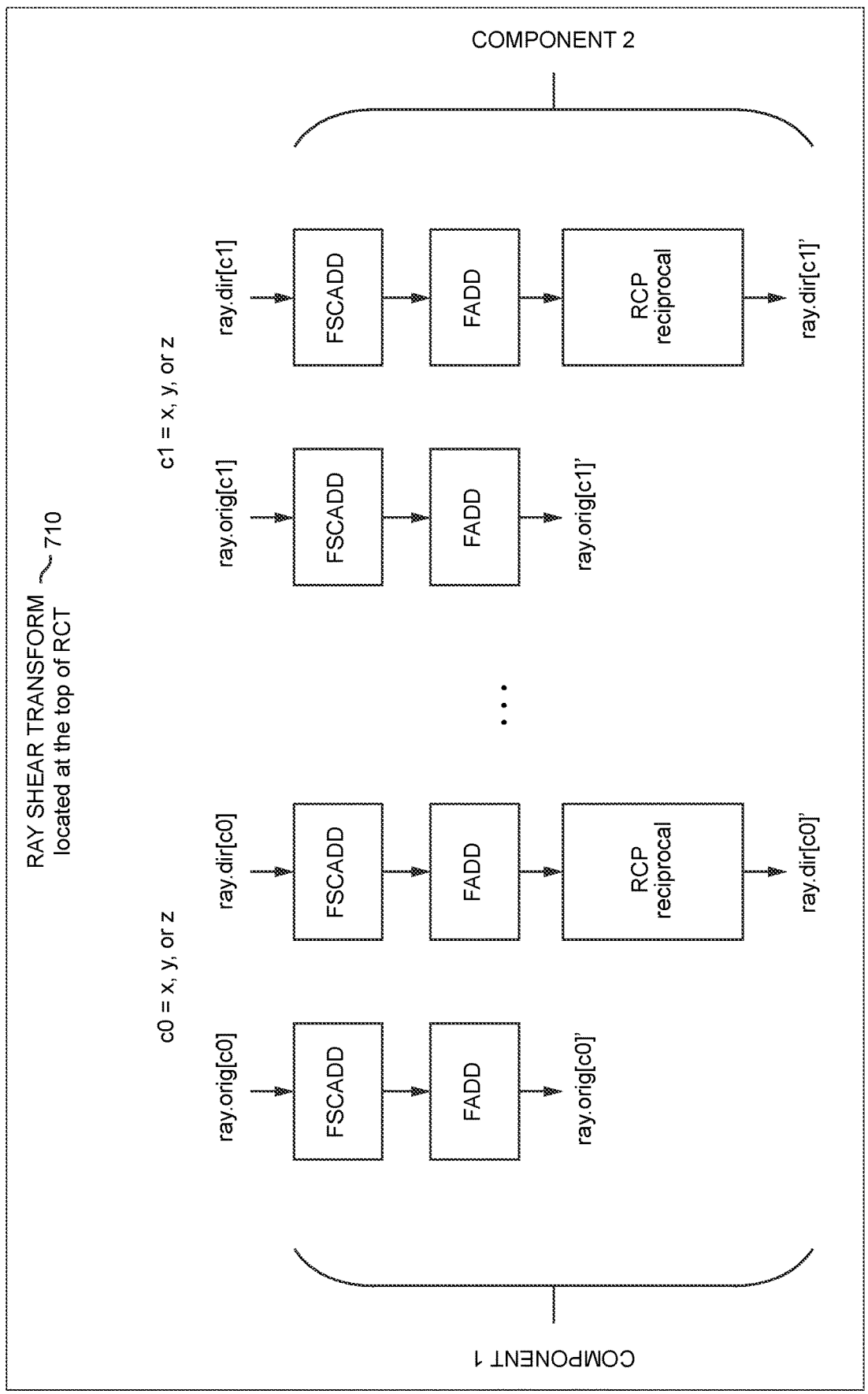

FIG. 16 shows an example functional block diagram of the ray shearing pipelines at the top of RCT which shear the incident ray before the ray-AABB test. The third ray component is not sheared in this example.

Figure 17:
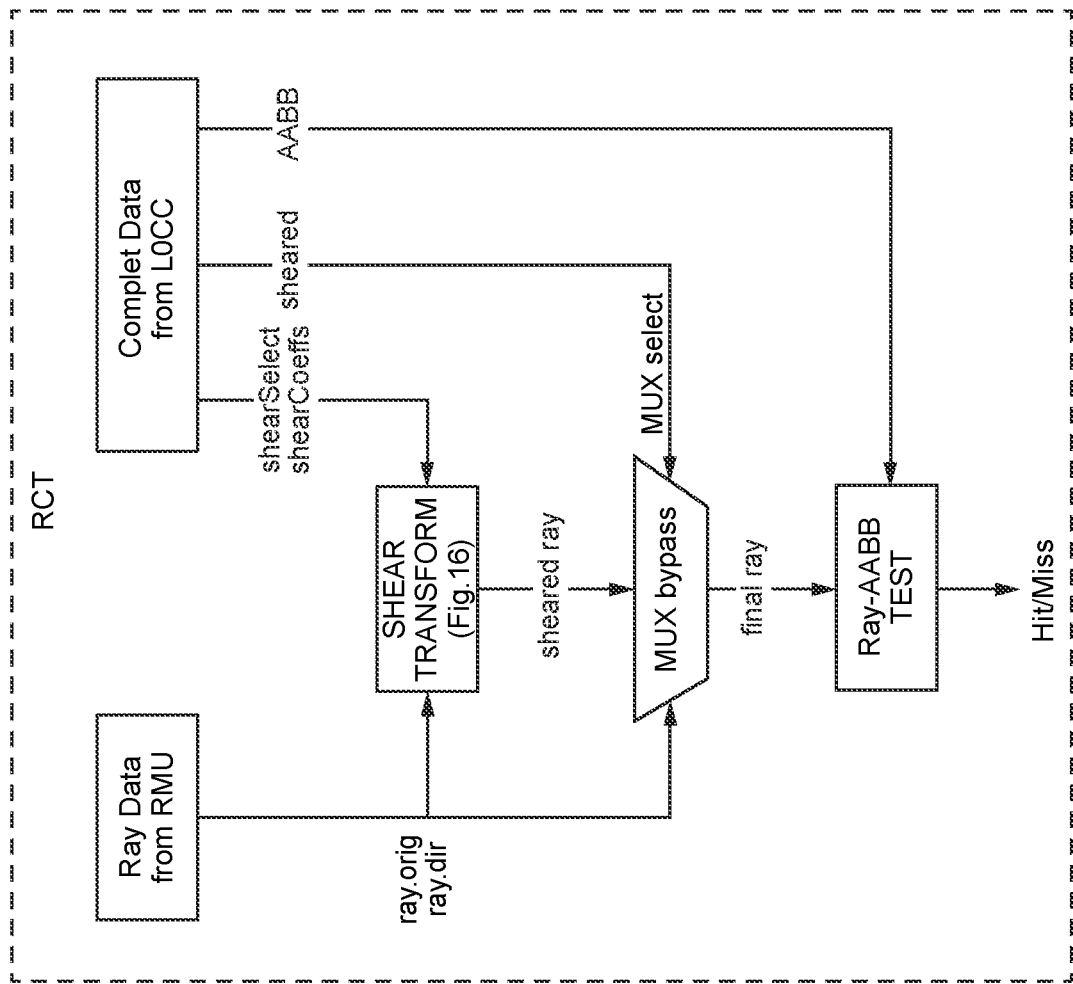

FIG. 17 is an example functional block diagram of the augmented RCT sub-unit which supports ray shearing before the ray-AABB tests.

Figure 18:
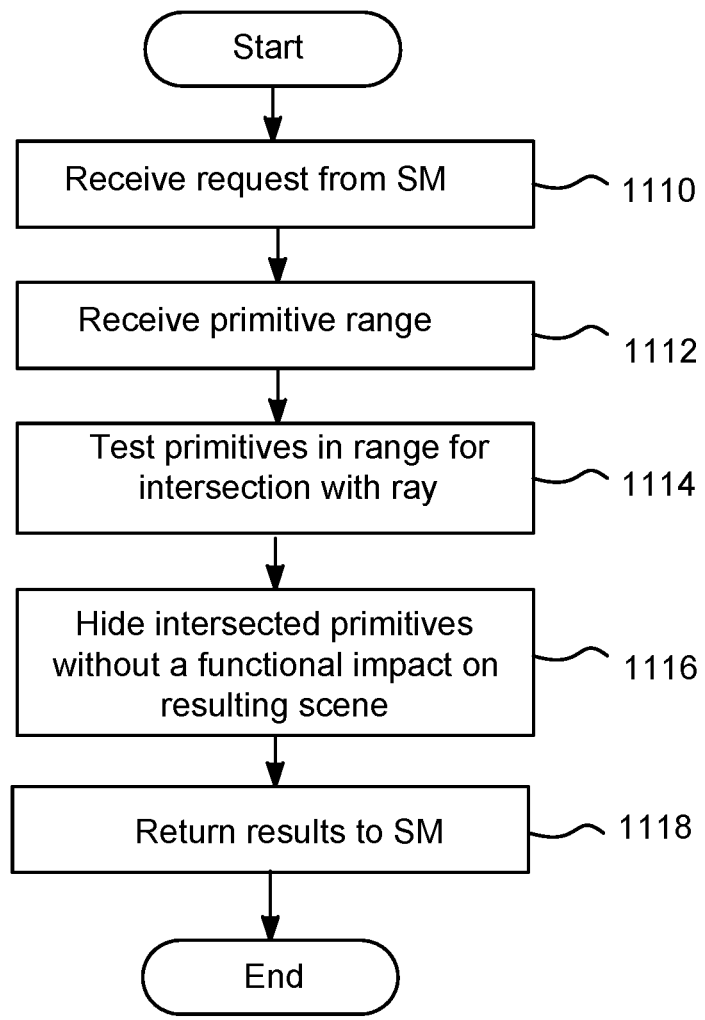

FIG. 18 is a flowchart of example TTU processing.

Figure 19A:
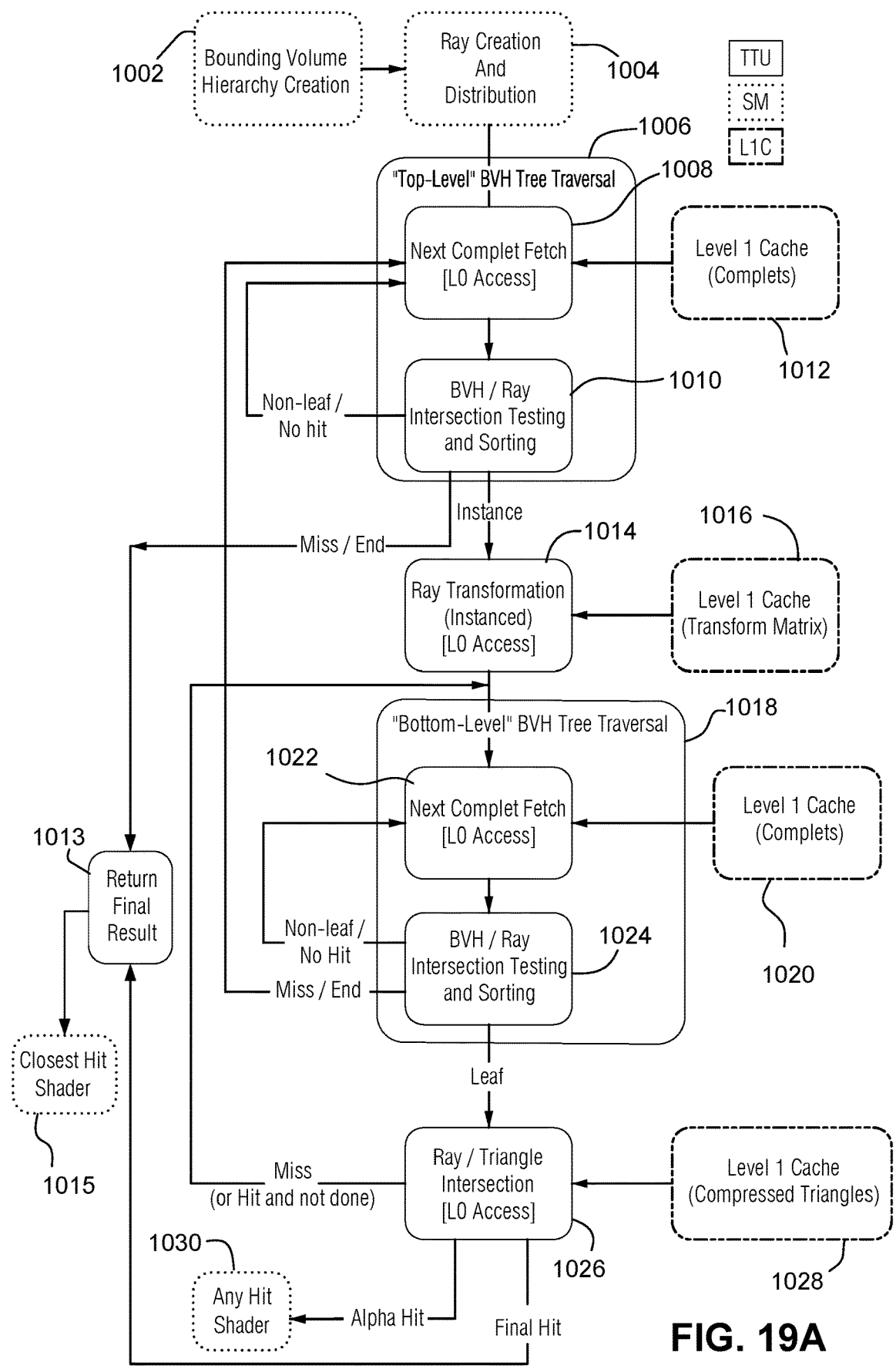
Figure 19B:
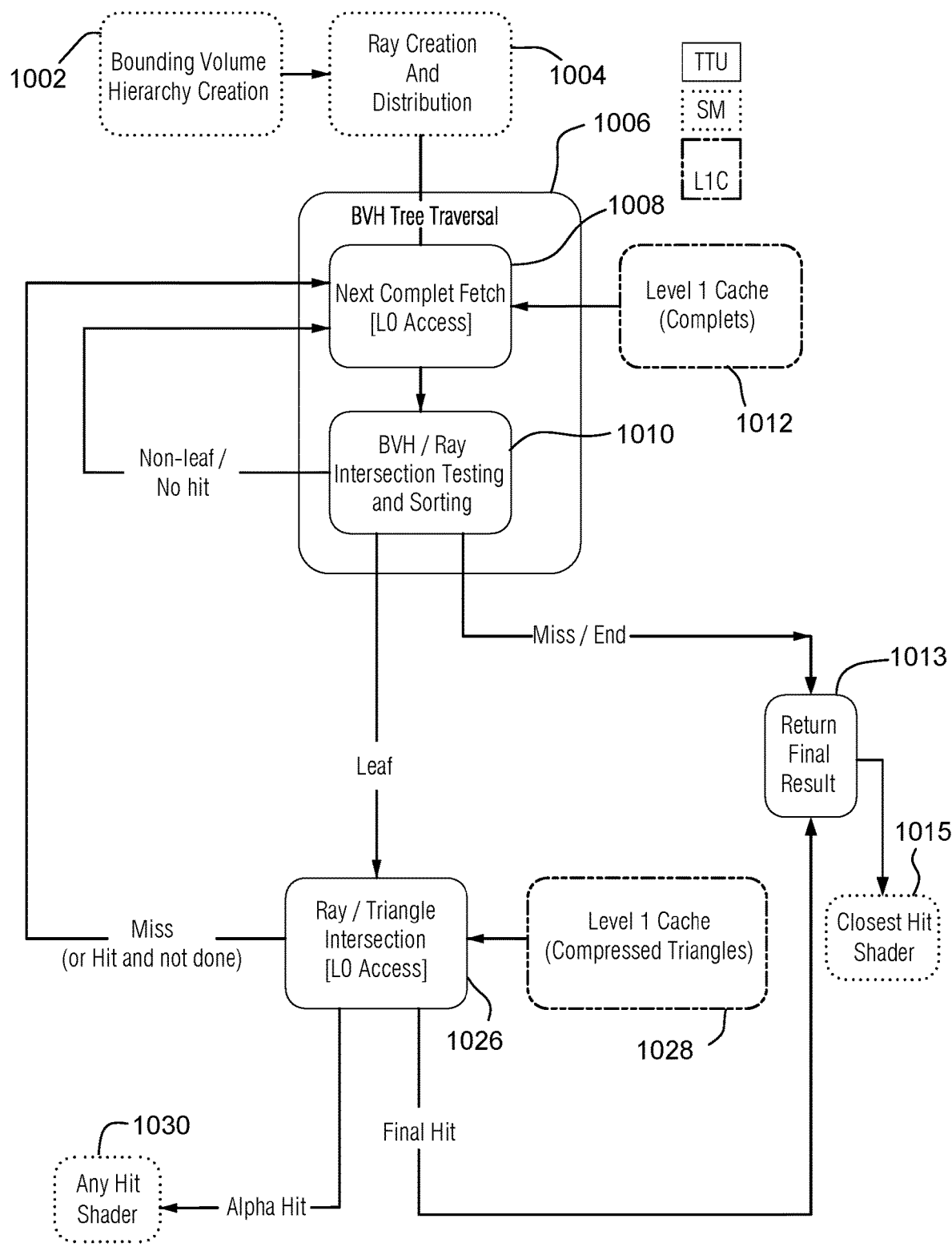

FIGS. 19A and 19B illustrate more detailed ray tracing pipelines to handle instancing.

Figure 20:
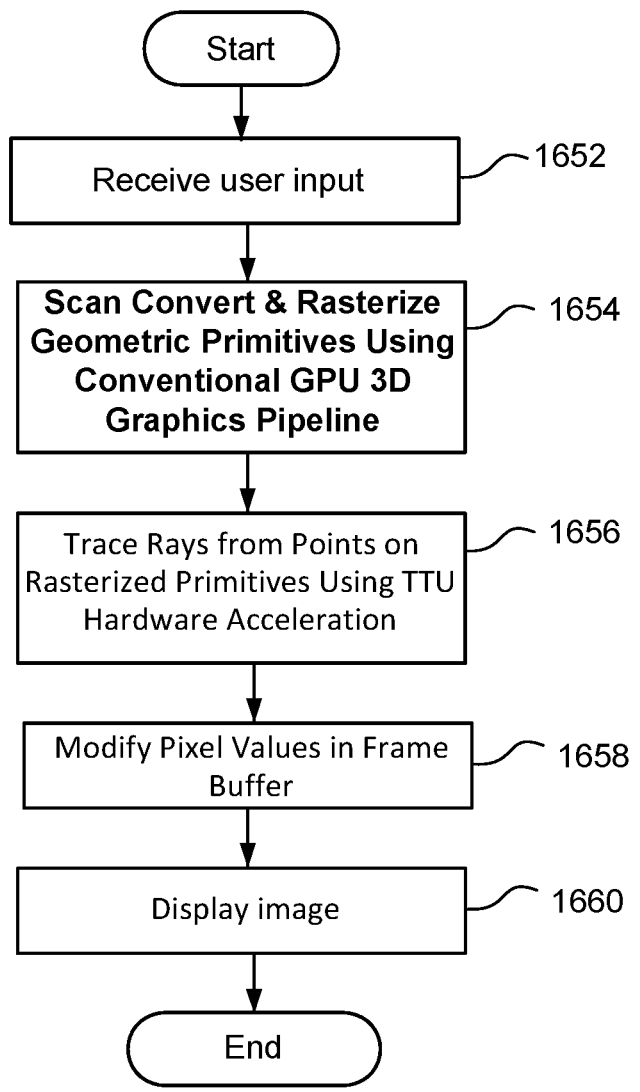

FIG. 20 is a flowchart of an example process to generate an image.

DETAILED DESCRIPTION OF NON-LIMITING EMBODIMENTS

To improve the efficiency of bounding volumes in a hardware based ray tracer, we employ a sheared axis-aligned bounding box to approximate an oriented bounding box typically defined by rotations. To achieve this, the bounding volume hierarchy builder shears an axis-aligned box to fit tightly around its enclosed oriented geometry in top level or bottom level space, then computes the inverse shear transform. The bounds are still stored as axis-aligned boxes in memory, now defined in the new sheared coordinate system, along with the derived parameters to transform a ray into the sheared coordinate system before testing intersection with the boxes. The ray-bounding volume intersection test is performed as usual, just in the new sheared coordinate system. Additional efficiencies are gained by constraining the number of shear dimensions, constraining the shear transform coefficients to a quantized list, sharing a shear transform across a collection of bounds, performing a shear transform only for ray-bounds testing and not for ray-geometry intersection testing, and adding a specialized shear transform calculator/accelerator to the hardware.

The example technology herein utilizes a per-complet, localized shear transform before performing a ray-box test to create tighter fitting bounding volumes and thereby reduce false positive intersections. For some cases, it is going to be very efficient to orient bounding volumes by approximating a rotation with a shear. Furthermore, limiting the possible shear transforms to a predetermined quantized set provides additional efficiency increases for hardware implementations.

Shear Transforms

A kind of affine transform called the "shear transform" is often used in computer graphics, for example to create typography, transform 2D images, and for other purposes. See for example Foley et al. Computer Graphics: Principles and Practice pp. 207-208, 216-217 (2nd ed. 1991); Schneider et al, Geometric Tools for Computer Graphics, pp. 153-157 (Morgan Kauffman 2003); Desai, Computer Graphics pp. 162-164 (2008). In addition, we have used shear transforms in ray tracing hardware in the past to transform geometry. See e.g., US20210390759.

Figure 1A:
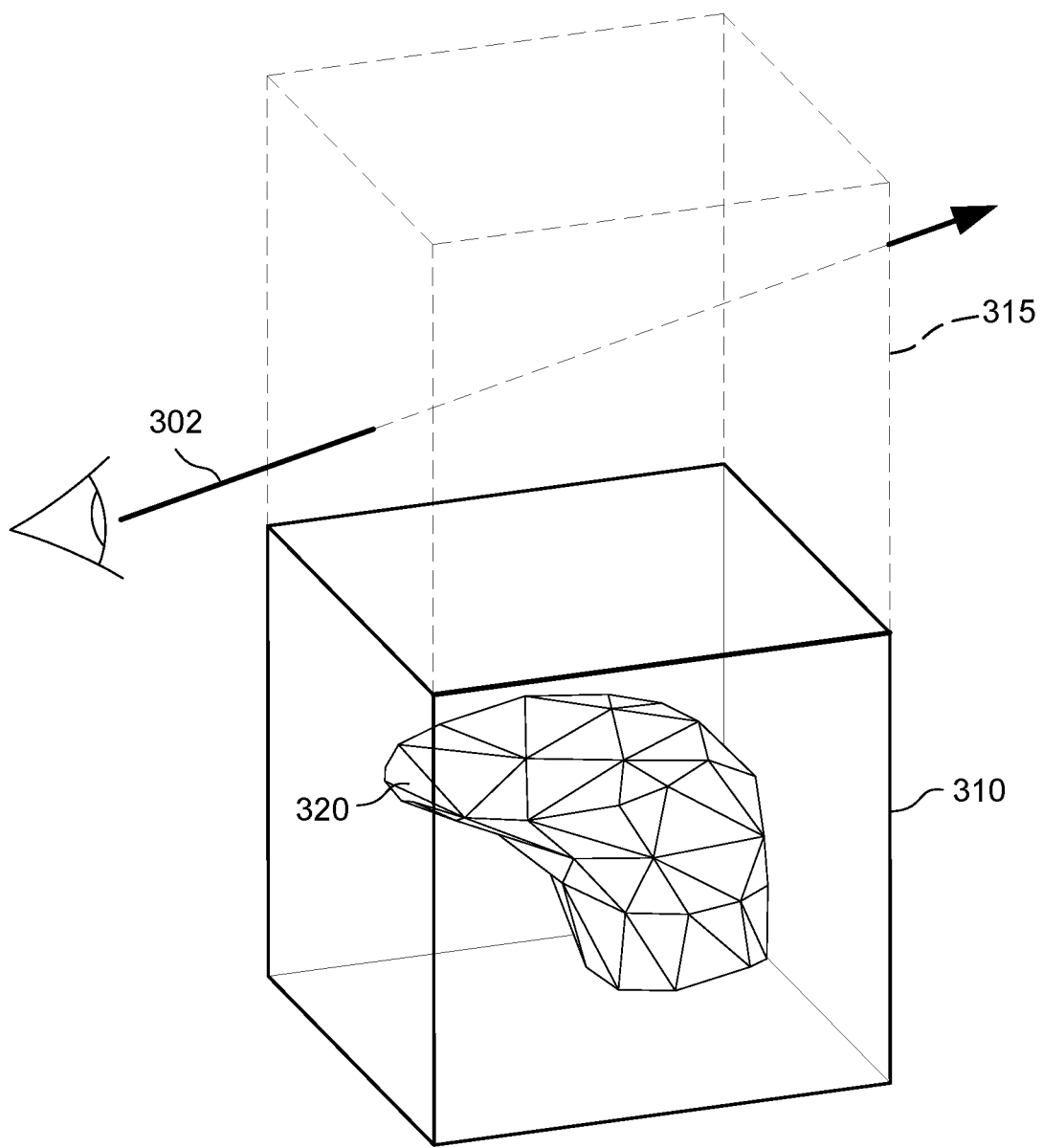
FIGS. 1A-1C show example simplified ray tracing tests to determine whether the ray passes through a bounding volume containing geometry and whether the ray intersects geometry within the bounding volume.
Figure 1B:
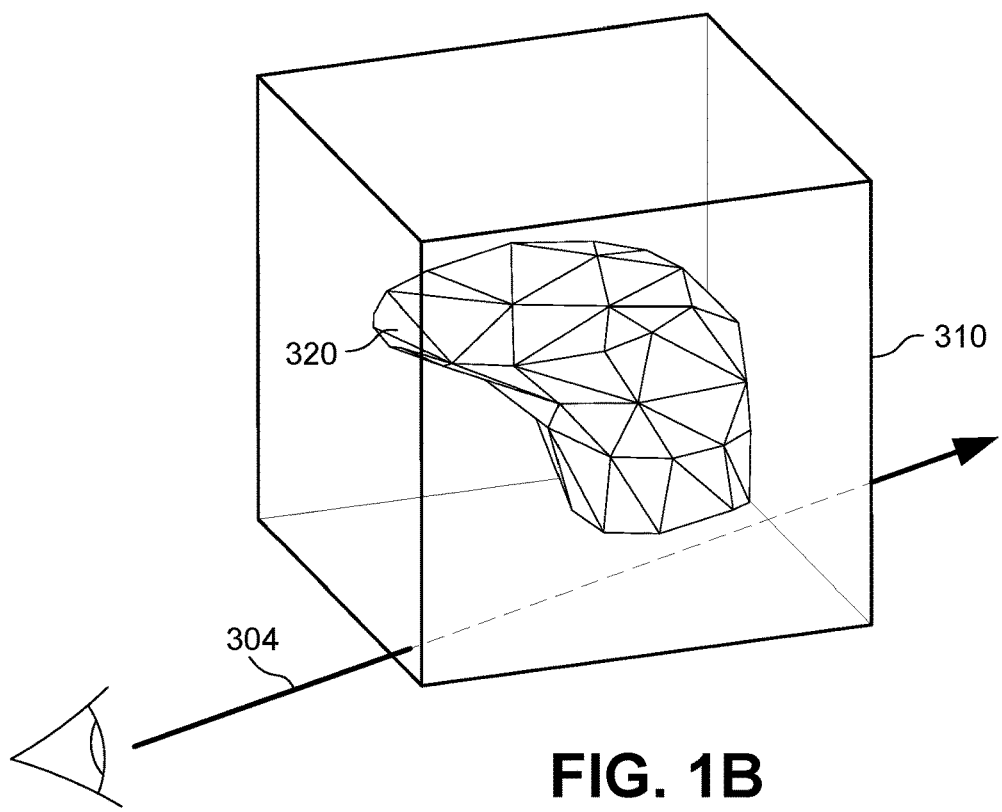
Figure 1C:
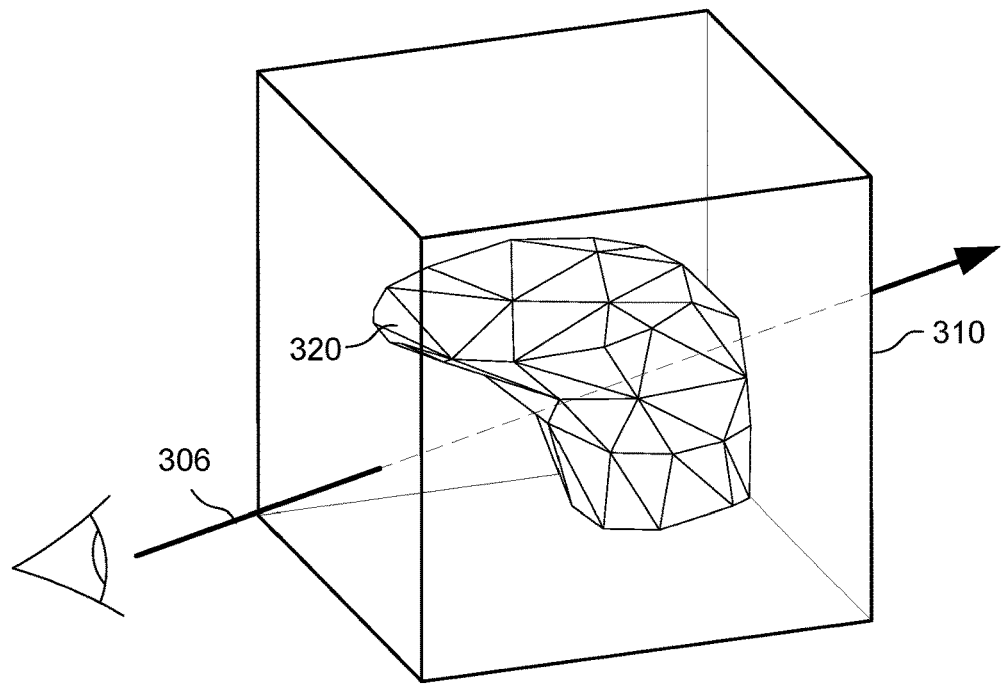
Figure 1E:
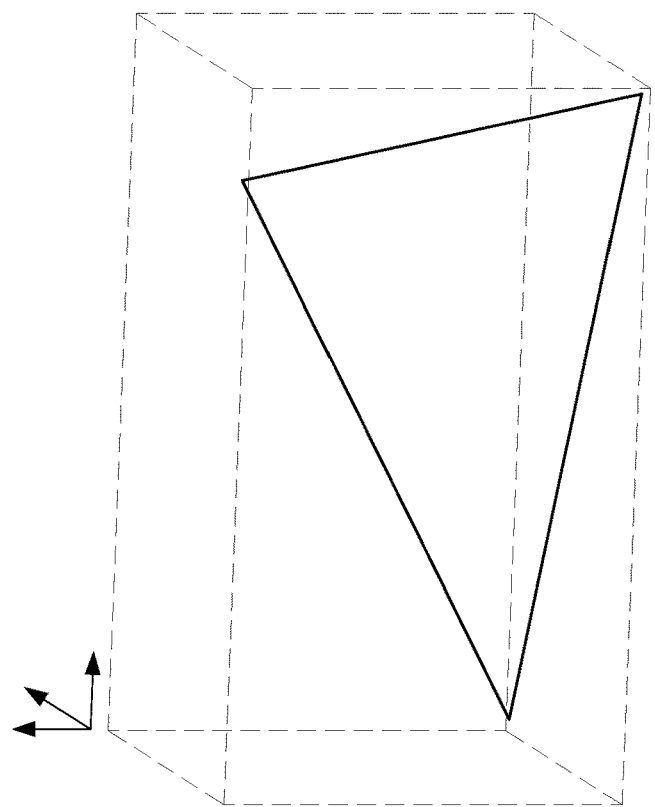
FIGS. 1D and 1E show example geometry that does not fit well within their axis-aligned bounding boxes.
Figure 1D:
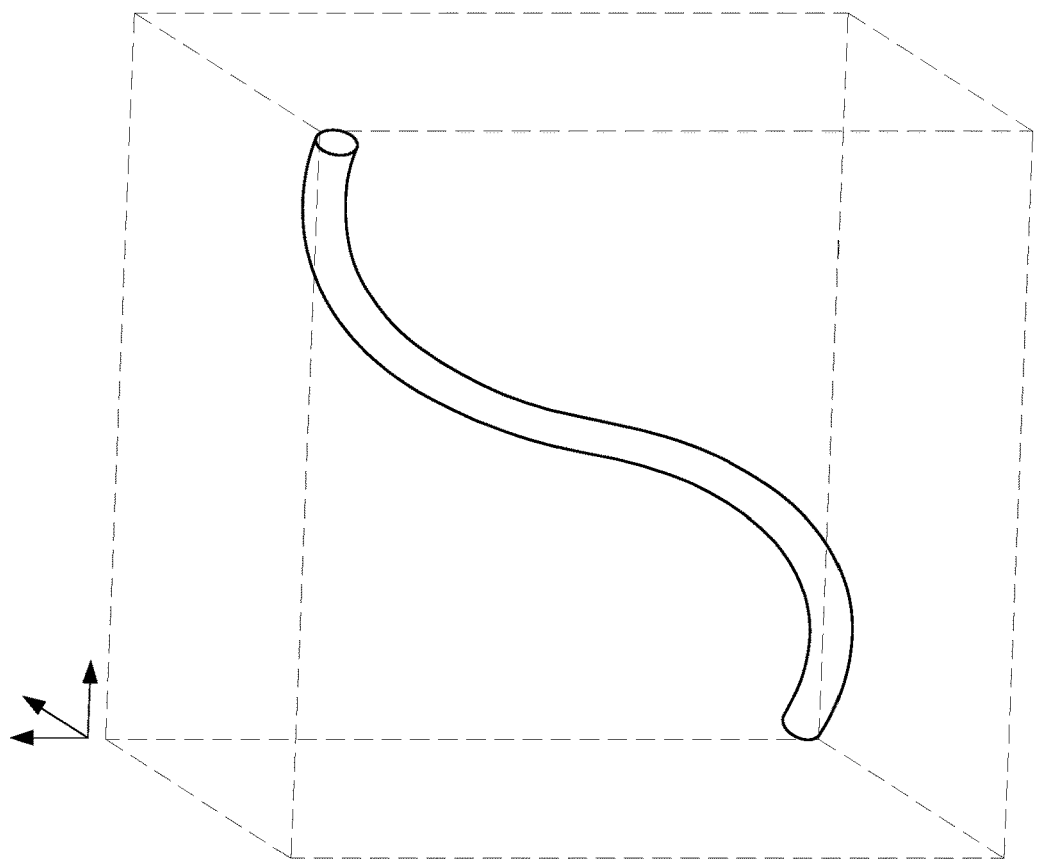
Figure 1:
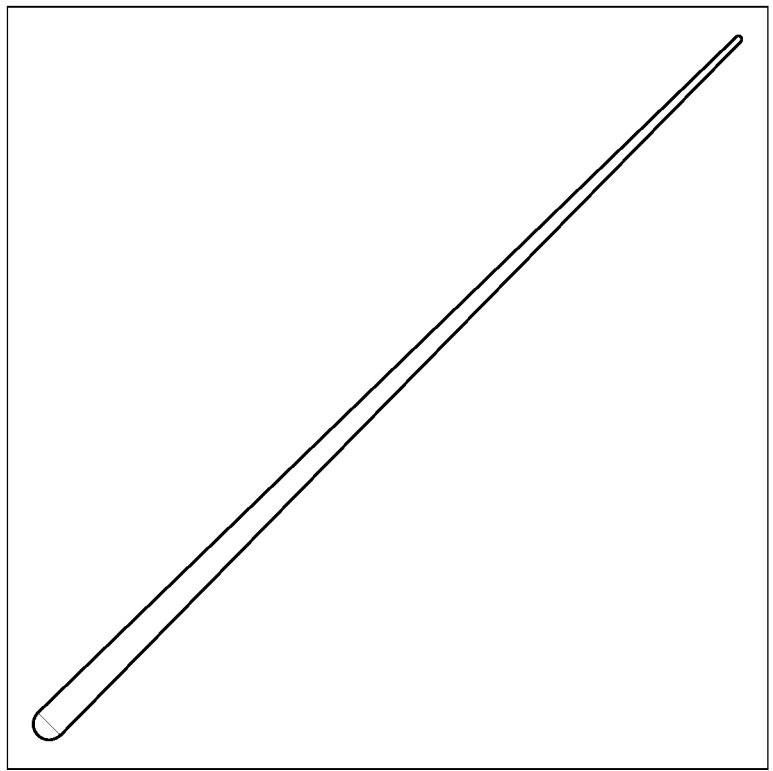
Figure 2B:
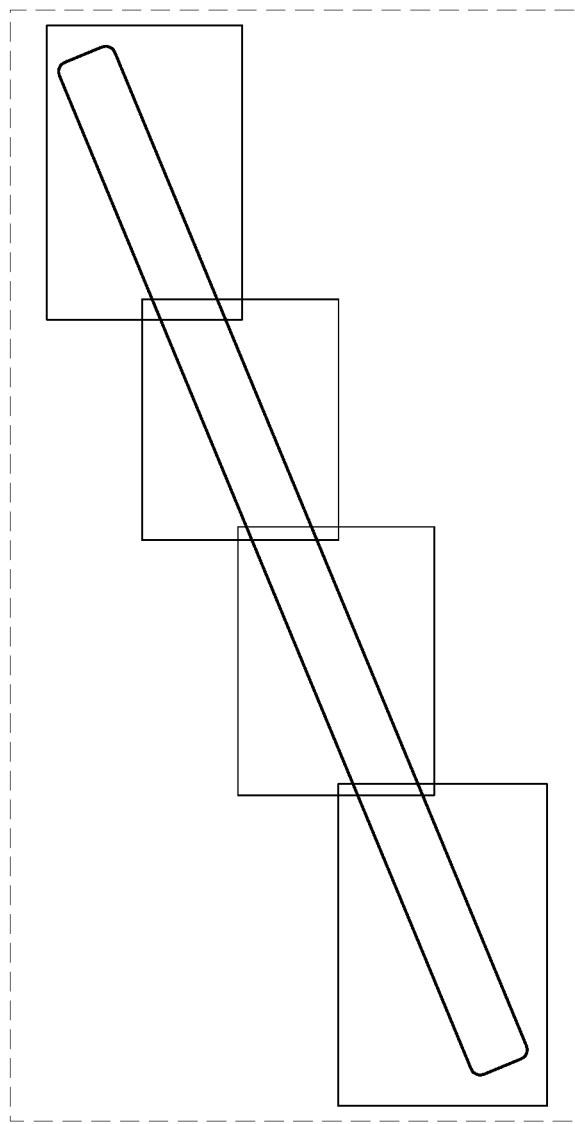
FIG. 2B shows how using multiple overlapping bounding boxes around non-oriented geometry can improve the overall bounding efficiency compared to naïve bounds (in red), but at the cost of increased storage.
Figure 2C:
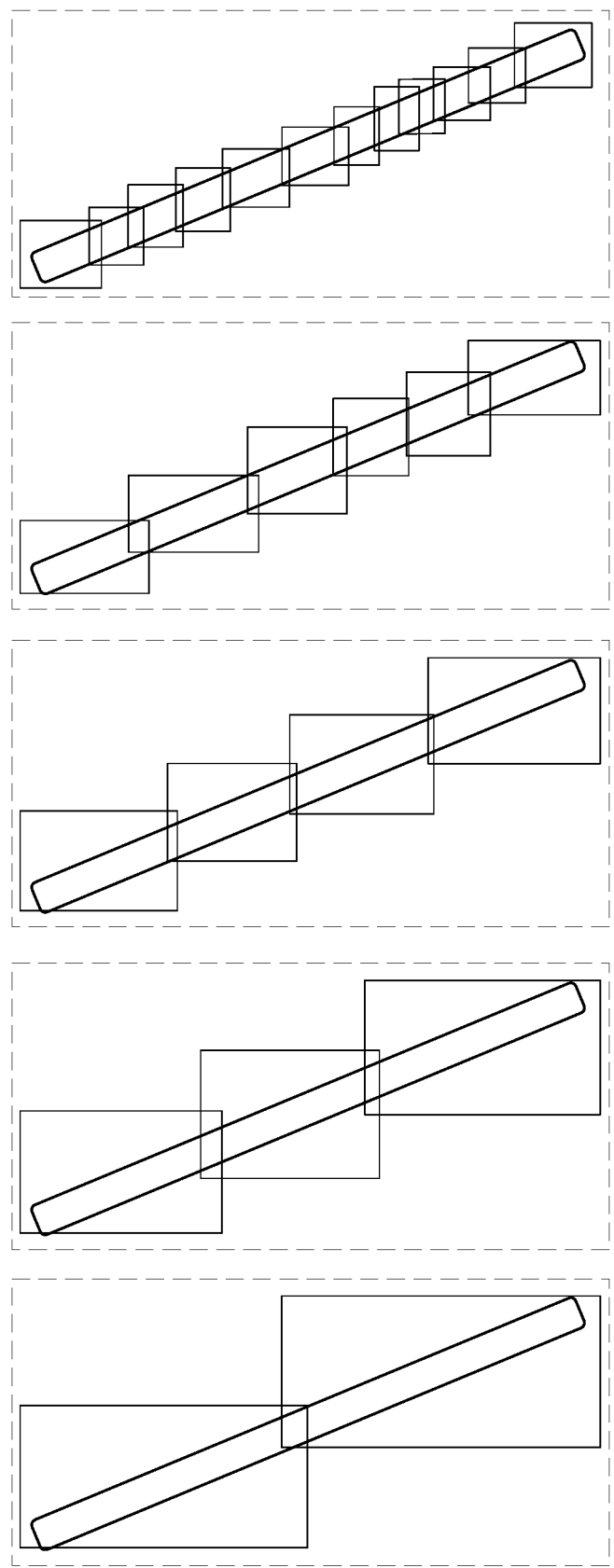
FIG. 2C shows how using more bounding boxes around non-oriented geometry produces better and better bounding efficiency, while also increasing the storage cost.
Figures 1, 4:
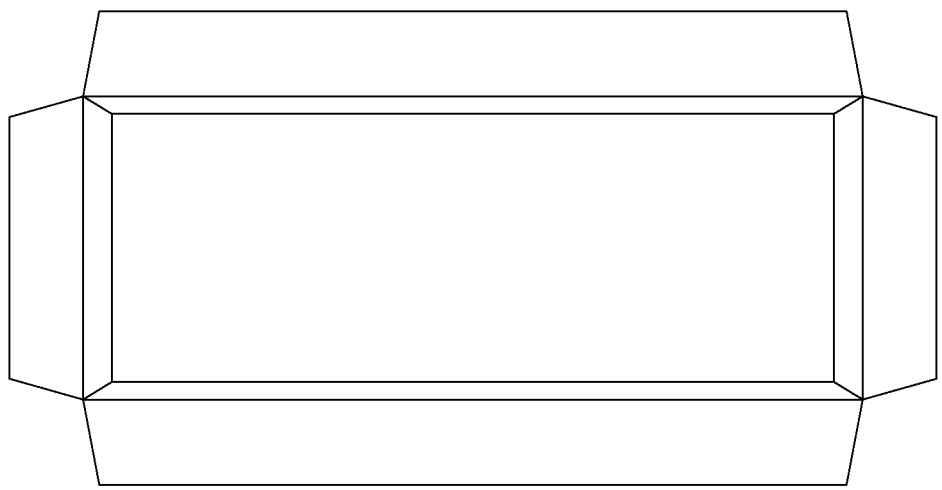
Figures 2, 4:
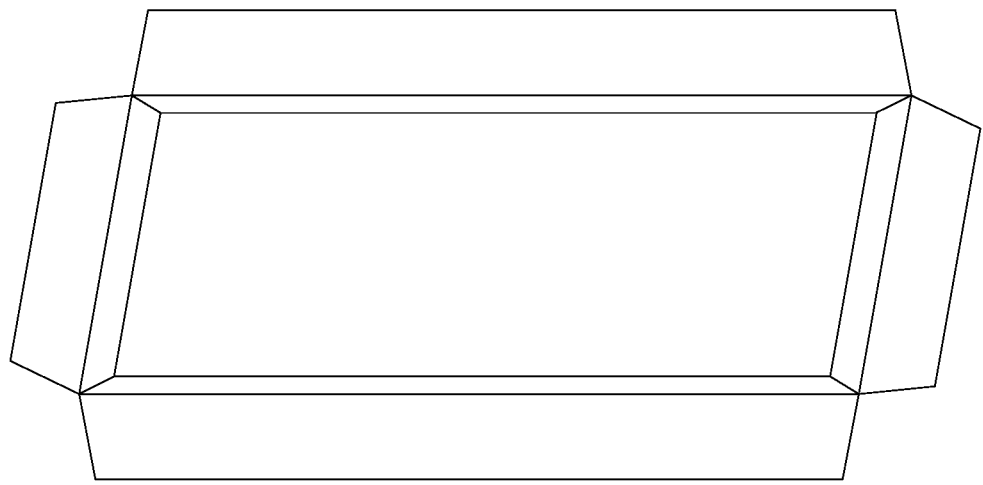
Figures 3, 4:
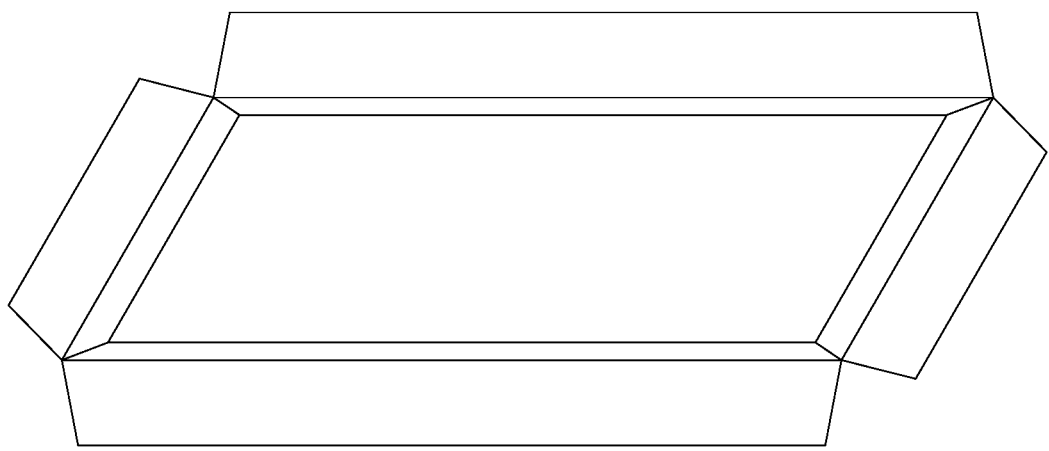
Figure 4:
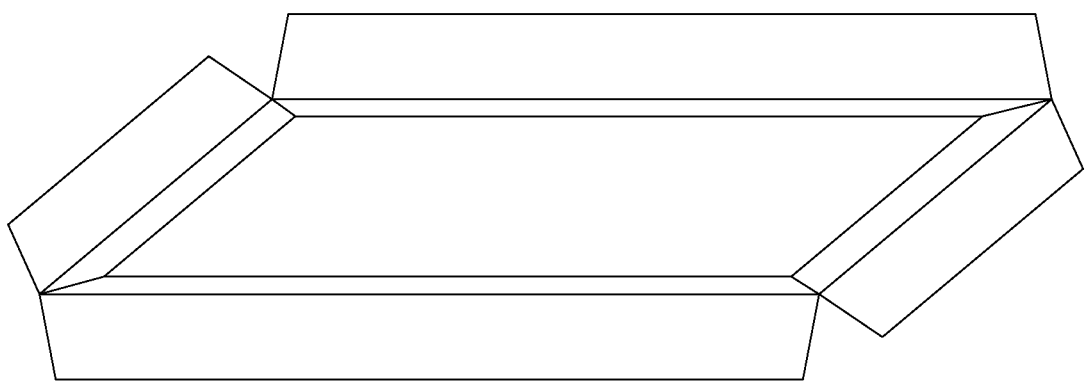
Figures 4, 5:
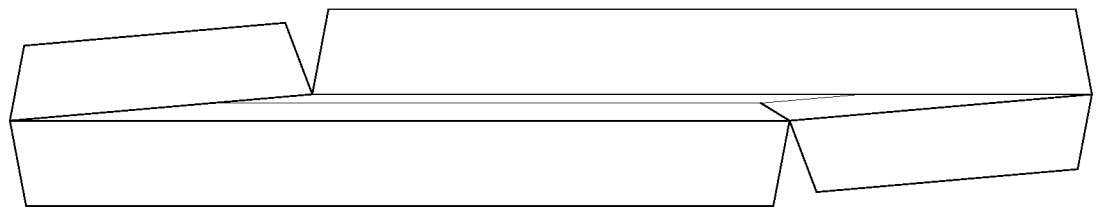
Figures 4, 5, 6:
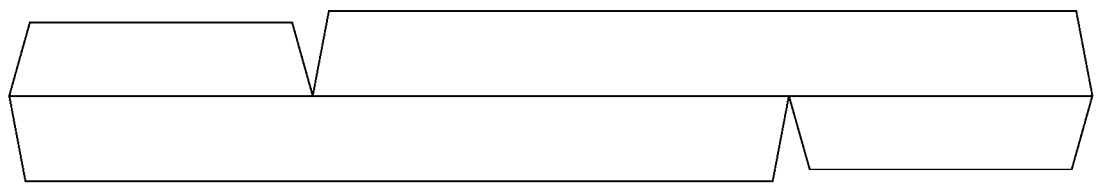

One can think about a shear transform as follows: imagine you are collapsing a cereal box to reduce its volume before recycling. You open both ends of the box so the cross section as seen from one end is a rectangle. See FIG. 4-1. As you push the sides of the carton in opposite directions, the box cross section tilts—while opposing sides of the box remain parallel, the corner angles are no longer 90 degrees. See FIGS. 4-2 & 4-3. This is an example of a shear transform along one direction. As you shear further, the area of the cross section is reduced (see FIGS. 4-4, 4-5) until eventually you have flattened the box (see FIG. 4-6). The reduction in volume of the cereal box through this operation is analogous to the attempt by example non-limiting embodiments to remove unnecessary volume from bounding volumes for ray tracing.

For certain 3D geometry (e.g., long skinny triangles or other geometry, filaments such as hair or blades of grass, etc.), shear transforms can provide many of the benefits of a full rotation such as for OBBs without incurring the computational costs. A shear transform is an invertible operation that, when applied to an axis-aligned bounding box, warps the AABB's shape (FIG. 3B) to approximate an oriented bounding box (FIG. 3A). Note the characteristic angled corners of the bounding box resulting from the shear transform.

Shear Transforms are Invertible

Interestingly, because the shear transform is an invertible operation, an inverted transform can be applied to the ray instead of the AABB to achieve the same effect. In other words, by shearing the ray, we are equivalently transforming (with the inverse transform) the volume that bounds the geometry so it becomes axis-aligned. By applying the transform to the ray instead of the AABB, the transform operation can be amortized across multiple parallel AABB intersections and the AABB coordinates can continue to be stored efficiently. It's often easier to think about this in terms of changing the AABB bounding box coordinates, so that's the operation we will discuss conceptually. But in example non-limiting hardware implementations, the shear transform is preferably applied to the ray rather than to the AABBs.

One way to understand this is to realize that both the ray and the AABB need to be in the same coordinate system in order to be tested against one another. And because the shear transform is invertible, inverse shear-transforming the ray into the bounding volume's coordinate system is equivalent to shear-transforming the bounding volume into the ray's coordinate system.

Example Inverse Shearing a Ray into AABB Shear Space

Figure 4B:
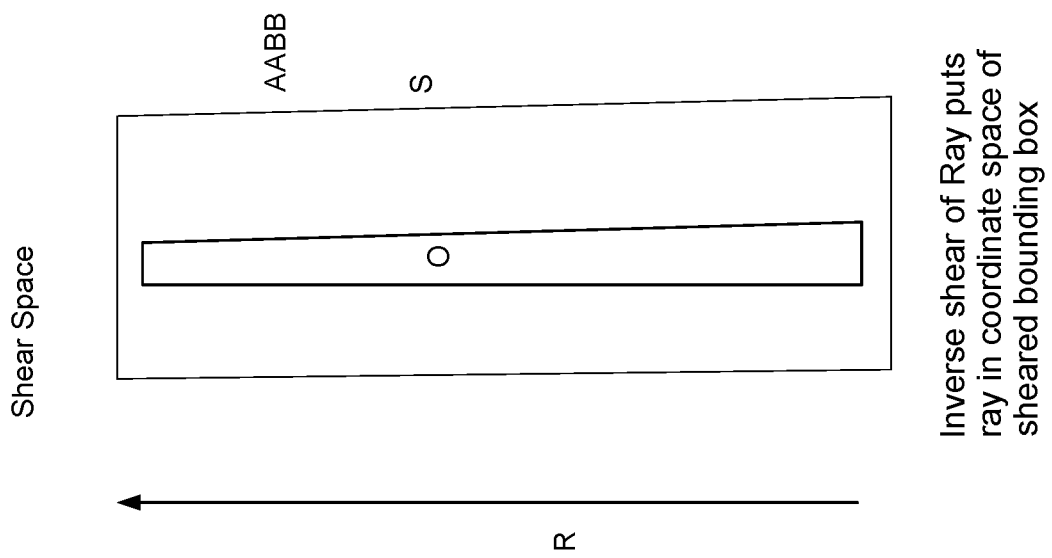
FIG. 4B shows how an inverse shear transform of a ray puts the ray in the coordinate space of a sheared bounding box.
Figure 4A:
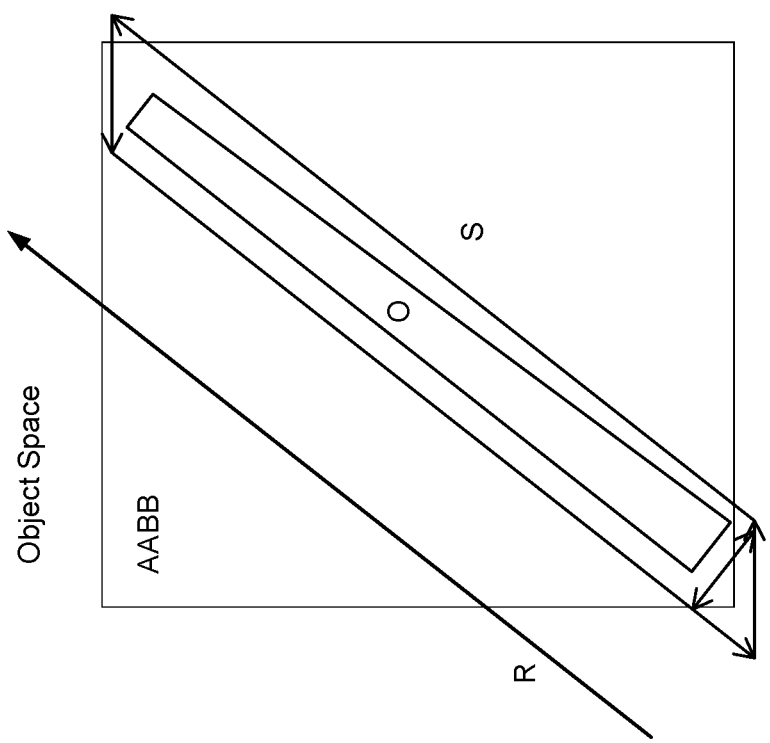
FIG. 4A schematically shows how a rays may intersect a conventional axis aligned bounding box for a long skinny object, resulting in many false positive ray-box intersection tests, and also shows how shearing the bounding box can provide a much tighter fit.

FIGS. 4A and 4B show example illustrative scenarios. FIG. 4A shows a long skinny object in object space that is misaligned relative to the axes of the space. This long skinny object does not fit well within the larger square axis-aligned bounding box AABB defined in object space. The large AABB box in FIG. 4A is not a box that one wants to test the ray against. This AABB box is too big and does not fit the geometry well. The ray R shown (which is in or is transformed into the same object space) will test positive for intersection with the AABB bounding volume even though the ray is nowhere close to the object and does not intersect it.

Instead, as also shown in FIG. 4A, one would rather test the ray against the smaller, sheared version S of the larger AABB box. FIG. 4A also shows that the object fits much better within its bounding box if the bounding box were to be warped (shear transformed) to S. This sheared bounding box version S fits the geometry well and its use would dramatically cut down on the number of false positives in the ray-box intersection testing.

But the sheared box is not axis-aligned in the object space coordinate system of the object into which the ray would be transformed for intersection testing. It therefore seems to have the same problem as the OBB's discussed above.

However, there is a coordinate system in which the sheared box is axis aligned—namely shear space, i.e., the coordinate system having axes that are aligned with the sheared bounding box. The sheared bounding box is axis aligned in that shear space coordinate system (see FIG. 4B).

The solution developed here is to transform the ray into that same shear coordinate system using an inverse of the shear transform that would be used to transform the sheared bounding box into the ray's coordinate system or another coordinate system such as object space into which the ray would be transformed.

Because the shear transform is an invertible operation, an inverted transform can be applied to the ray instead of the AABB to achieve the same effect as transforming the bounding volume from shear space into the ray's coordinate system. In other words, by shearing the ray, we are equivalently transforming (with the inverse transform) the volume that bounds the geometry so it becomes axis-aligned in a coordinate system the ray can be tested against. Moreover, by applying the transform to the ray instead of the AABB, the transform operation can be amortized across multiple parallel AABB intersections (e.g., if the same transformed ray is tested against many objects in the same complet) and the AABB coordinates (e.g., just the leftmost and rightmost corners) can continue to be stored efficiently.

In more detail, the example embodiment already provides an efficient way to store an axis aligned bounding box. Therefore, in one embodiment, the hardware inverse shears the ray instead of the bounding box, thus acting like a coordinate system transform. By shearing the ray, the ray is being moved into a sheared coordinate system of the sheared bounding box such as shown in FIG. 4B. This sheared coordinate system is different from the coordinate system of the object space as shown in FIG. 4A. In that FIG. 4B sheared coordinate system, the bounding box is no longer warped, and instead is axis aligned as FIG. 4B shows. The ray once transformed into the same shear space (the ray's direction is modified by the shear transform as also shown by comparing FIGS. 4A and 4B) can be tested against an axis aligned bounding box, i.e., a box that fits the geometry well and is aligned to the axes of the sheared coordinate system using legacy mechanisms for efficiently representing an AABB.

This process thus leverages existing legacy hardware to store an axis aligned bounding box and to test the ray against an axis aligned bounding box, by encoding and performing the transform the ray needs to get into that axis aligned shear coordinate system where these other operations are already well defined. Existing legacy hardware already includes a capability and circuitry to transform a ray from world space to object space before testing the ray against an AABB bounding box. By shearing the coordinate system of the AABB bounding box, a better fit may result that incurs little or no additional computation overhead. However, as discussed below, we have also improved the hardware to provide additional calculation capability for a limited set of inverse shear transforms in order to optimize the variety of shear transforms we can apply.

In one embodiment, the BVH builder develops a shear transform that would warp the AABB bounding volume into a more efficient orientation for the geometry. The BVH builder stores parameters of the inverse of this transform in association with the bounding volume. Then, when it comes time to test a ray against the object's bounding volume, the example embodiments apply the stored inverse shear transform parameters on the ray to transform the ray just before testing the ray against the bounding volume. See FIG. 4B. Once again, by shearing the ray, we are equivalently transforming (with the inverse transform) the volume that bounds the geometry so it becomes axis-aligned.

When applying to a ray, the shear transform is done on both the direction and the origin of the ray—i.e., the two parameters that may be used to define the ray—and is thus acting as a ray coordinate system transform that transforms the ray into a sheared object's coordinate system for testing the ray against the object's bounding volume. Because of this inverse transform applied to the ray, the ray and the bounding volume are now in the same axis aligned (shear) coordinate space and so can be tested against one another for intersection. In the sheared coordinate system, the ray has had its direction modified by the shear transform as shown in FIG. 4B and is then tested against the object's bounding box. As one can see from FIG. 4B, now that the bounding volume more closely fits the object, the ray no longer intersects the bounding volume but instead misses it.

To implement this requires only encoding the transform for the ray since the hardware tests the shear transformed ray against the axis aligned coordinates of the AABB. And because the same ray is typically tested against a number of bounding boxes for each cycle, it is typically more efficient to shear-transform the ray once as opposed to shear-transforming each of the many bounding boxes—especially in example implementations that already provide ray transforms from TLAS world space to BLAS object space to support instancing.

One skilled in the art will understand that the fact that the ray-bounding volume intersection test is performed in a sheared coordinate system does not mean or imply that ray-geometry tests should also be performed in the same sheared coordinate system. Rather, the shear transform's main value in some embodiments is to provide more efficient testing between a ray and a bounding volume, i.e., to reduce the number of false positives by effectively reducing the size of the bounding volume enclosing the geometry that is used for testing against the ray. In some embodiments, in cases where the ray-box intersection test detects an intersection, a subsequent ray-geometry intersection test will be performed object space (not shear space), thereby eliminating the need for the BVH builder to transform the geometry itself into shear space. Thus, in such embodiments, two different transforms may be applied to any given ray for intersection testing: the ray is first transformed into shear space for testing against the geometry's bounding box, and if there is an intersection, the ray is then transformed (or in some embodiments may simply be reverted) into object space for testing against the geometry. Those skilled in the art will understand that different choices could be made depending on various factors including the geometry, the way the intersection testing is structured, etc.

Example Implementation of the Shear Transform

A full 3D shear transform takes six shear coefficients (A, B, C, D, E, F) and an input point (x, y, z), and outputs a new point (x', y', z') that is a linear combination of the input point's coordinates:

$$x'=x+Ay+Bz$$

$$y'=Cx+y+Dz$$

$$z'=Ex+Fy+z$$

A full 3D shear transform thus requires storage of six coefficients and math that does the equivalent of six 2-component dot-products with an add (DP2A). Both the storage of coefficients and the area and latency for the math operations may be problematic for very fast, compact hardware accelerator implementations. But we have discovered opportunities to, in one embodiment, reduce complexity by imposing strategic limitations on the way we implement, constrain and perform the shear transform.

Figure 6A:
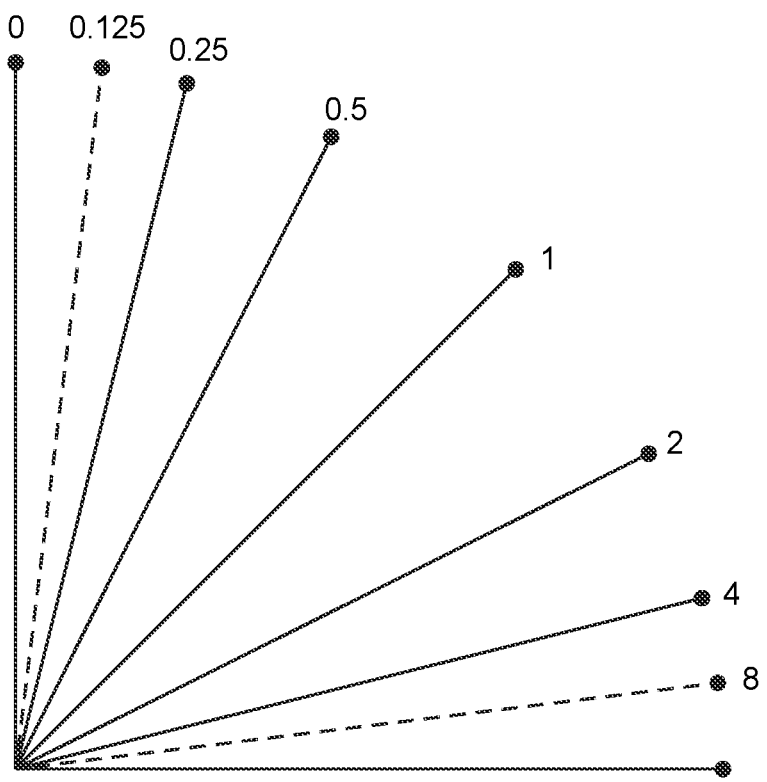
FIG. 6A shows an example sample range of allowed shear angles when the shear coefficients are restricted to powers-of-two (a meaningful range of shear angles can be achieved with just a few power-of-two shear coefficients).

We tackle both the storage problem and the complex math problem first by noting that certain angles can be achieved with a simple power-of-two coefficient (see FIG. 6A). And second by restricting the shear to be only along one or two axes as opposed to a 3D shear transform (we note that a shear transform along only one or two axes is still a shear transform).

Restricted Coefficients with a Single-Axis Transform:

FIGS. 5A-D illustrates how a shear transform can be applied for the x coordinate, the y coordinate or both the x and y coordinates.

Figure 5A:
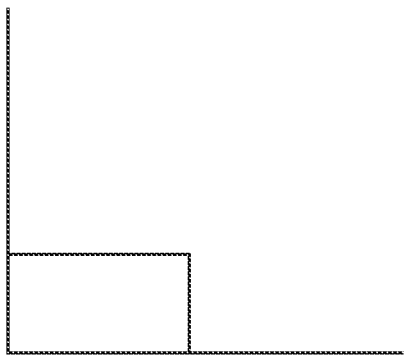
FIGS. 5A-5D show how shear transforms can be applied in different directions or along different axes.
Figure 5B:
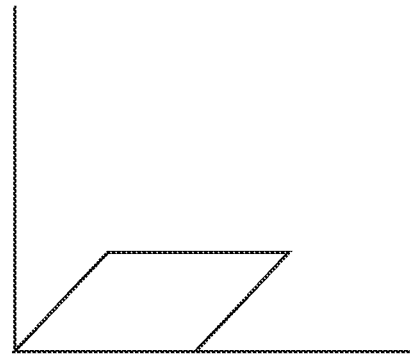
Figure 5C:
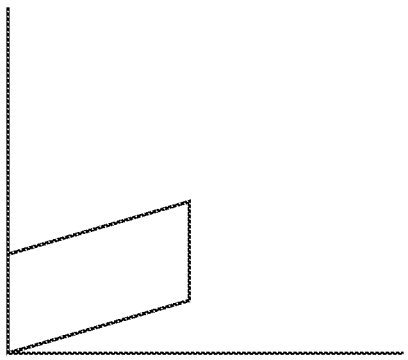
Figure 5D:
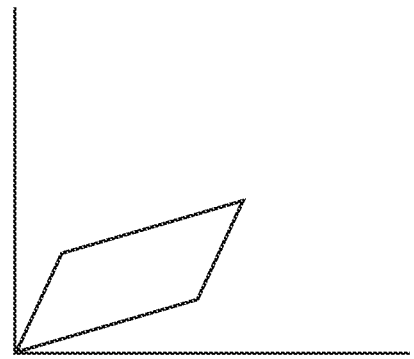

A single-axis shear transform in one dimension such as shown in FIG. 5B or 5C uses only one of the three equations above. E.g., an x-axis shear transform such as shown in FIG. 5B would use just this equation:

$$x'=x+Ay+Bz$$

The single-axis shear transform then only requires two coefficients: (A, B), (C, D), or (E, F). This is a substantially simpler calculation than would be used for the multi-axis shear transform. Such single axis shear transforms can be used to achieve increased efficiency for a variety of different objects such as long skinny objects, long skinny filaments such as hairs or blades of grass, a mesh of flat (planar) triangles, etc. Often such geometry may have dimensions along at least one and in some cases two axes that are already relatively small, meaning that shearing along those axes is unlikely to gain much efficiency. However, shearing relative to a third axis along which the geometry has a large dimension can substantially reduce the effective size of the AABB to test rays against.

To ensure the best possible fit, a multi-axis transform may be more suitable for some geometry. But the BVH builder can be configured to select a single axis for an object such that shearing the object against that axis will best reduce the extra space within the AABB for the ray to test against (the BVH builder can select different axes for different geometry). In example embodiments, the BVH builder can alternatively select to shear on two axes using only two coefficients. Limiting the shear transform to a predetermined set of reduced-computation shear transforms reduces the complet storage space needed to store the ray inverse shear transforms.

Constraining the Shear Transforms to a Quantized List or Set of Angles

As mentioned above, a further efficiency can be realized by restricting the shear transform to a selected transform from a quantized list or set of shear angles that enable hardware to perform the shear transform efficiently. Limiting the size of the quantized list or set reduces the number of bits needed to encode the shear angle and thus the required additional storage space. However, a big improvement in efficiency in some embodiments is provided by constraining the quantized list or set of shear angles to those that can be calculated efficiently using simpler, low footprint (in terms of chip real estate) calculation hardware.

For example, by supporting the following power-of-two coefficients (which provide as good selection of shear transforms that can be very efficiently performed using floating point math calculators such as merely by multiplying or dividing by a power of two—i.e., implemented by shifting the value one place right or left in a floating point register), we can achieve the full range of shear angles shown in FIG. 6A. Even more compactly, we can use a signed subset to do the same: $\pm[0, \frac{1}{8}, \frac{1}{4}, \frac{1}{2}, 1]$. Note that while this set doesn't include the values of 2, 4, or 8 as seen in FIG. 6A, the negative in front allows us to go from another axis to reach the same point. E.g., a $-1$ coefficient on the x-axis is equivalent to a 1 from the y-axis, a $-\frac{1}{2}$ from the x is equivalent to a 2 from the y, etc.

$\pm[0, \frac{1}{8}, \frac{1}{4}, \frac{1}{2}, 1]$

Since in one embodiment the shear coefficients are further restricted to only powers-of-two (including sums of powers-of-two), any shear equation can be expressed in the following form (where $2^n$ and $2^m$ are the final coefficients):

$$x'=x+y*2^n+z*2^m$$

(This Formulation Applies to all Axes)

There is a tradeoff between the number of selections in the quantized list and how tightly any arbitrary geometry will fit in the resulting shear transformed bounding volume, but in one example implementation, the calculation and storage efficiencies gained by limiting the possible shear transforms to ones that can be stored and calculated efficiently are deemed worth the increase in the sheared bounding effective volume size. Those skilled in the art will understand this technical tradeoff and be able to make modifications based on relative memory bandwidth and speed performance of a particular system. It should further be noted that such constraint of limiting the number of quantized or discrete transform values that may be selected and applied could potentially be used to increase efficiency of transform types other than the shear (e.g., rotation) to achieve increased efficiency for broader classes of geometry.

Hardware Computation Improvements

To further increase performance, it is possible to optimize or customize the hardware to efficiently perform the above shear transform operation. In particular, the expression $y*2^n+z*2^m$ can be efficiently computed with a new math unit, operator or hardware based calculator called a "floating-point scaled add", or FSCADD:

$$FSCADD(b0,e0,b1,e1)=b0*2^{e0}+b1*2^{e1}$$

In one embodiment, the FSCADD unit exploits the floating-point format to perform an input scaled add for only ~2% more area than a floating-point add (FADD) unit and the same latency for some implementations.

Figure 6B:
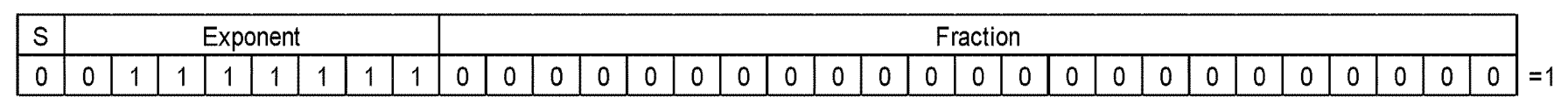

The inputs b0 and b1 are in IEEE 754 floating-point format which specifies a single sign bit, 8 exponent bits, and 23 fraction bits (FIG. 6B). Because the floating-point format explicitly encodes a base2 exponent, scaling the input by $2^n$ can be done by simple integer addition on the input's exponent, with some special case handling for subnormals and infinity. The scaled inputs are then passed to a standard FADD to finish the computation (FIG. 13).

For these transforms, the hardware computes the full shear equation by chaining a FSCADD with a FADD like so:

$$x'=x+y*2^n+z*2^m=FADD(x,FSCADD(y,n,z,m))$$

(This same formulation applies to all axes)

Two-Axis Transforms Still with Only Two Coefficients:

Another option is a reduced two-axis transform, which can also be performed with only two coefficients by shearing the two axes by the third axis like so:

$$x'=x+Bz$$

$$y'=y+Dz$$

There are three combinations allowed:

$$(B,D): x'=x+Bz; y'=y+Dz;$$

$$(C,E): y'=Cx+y; z'=Ex+z;$$

$$(A,F): x'=x+Ay; z'=Fy+z;$$

The previous single-axis shear transforms are useful for triangle-like objects, where the two largest components of the bounding box can remain unchanged. These two-axis shear transforms are useful for line-like or skinny objects, where only the largest component of the bounding box remains unchanged.

For the two-axis transform, the shear equation for each individual axis is simpler since each axis is sheared only by one other axis. For these transforms, the FSCADD unit can be utilized to compute a shear coefficient that is a sum of two powers-of-two coefficients. This expands the set of supported coefficients to the following:

$\pm[0, \frac{1}{8}, \frac{1}{4}, \frac{3}{8}, \frac{1}{2}, \frac{5}{8}, \frac{3}{4}, \frac{7}{8}, 1]$ In many cases, there's an option to get to several numbers through either subtraction or addition but some values must use only addition while other values must use only subtraction. In particular, there are four values added above that are combinations of simple powers of two. Of those, $\frac{3}{8}$ and $\frac{3}{4}$ may be calculated by using either addition or subtraction (e.g., $\frac{3}{8}=\frac{1}{4}+\frac{1}{8}$ or $\frac{3}{8}=\frac{1}{2}-\frac{1}{8}$), while $\frac{5}{8}$ must use addition (i.e., $\frac{5}{8}=\frac{1}{2}+\frac{1}{8}$) and $\frac{7}{8}$ must use subtraction (i.e., $\frac{7}{8}=1-\frac{1}{8}$).

Like the single-axis transforms, the hardware computes the full shear equation for the two-axis transforms by chaining a FSCADD with a FADD like so:

$$x'=x+y*2^n+y*2^m=FADD(x,FSCADD(y,n,y,m))$$

(This Formulation Applies to all Axes)

However, unlike the single-axis transforms, both the b0 and b1 inputs to the FSCADD are the same (both inputs are "y" in the above example).

It should be noted that not all geometry may be particularly suited for testing with a shear-transformed bounding volume. Some geometry is already sufficiently tightly enclosed by an AABB bounding volume so no appreciable gains in efficiency are attained by an additional shear transform. Other geometry may not fit appreciably better after a shear transform is applied. However, certain geometry such as long thin triangles, long skinny line segments or filaments, etc. are ideal candidates for increased efficiency using shear transforms. In one example embodiment, the BVH builder can perform tests or other identifications of the geometry to determine whether a performance gain is likely to occur if a shear transform is applied, and then select and designate particular complets for bounding volume testing against shear transformed rays.

Example Non-Limiting Implementation

The following provides more detail on how to construct BVH acceleration structures that supports/provides the technology herein and can be encoded using wide complet formats. Following that, an overall hardware based real time graphics processing system including real time ray tracing hardware that can traverse and manipulate such acceleration structures is disclosed.

Building a Bounding Volume Hierarchy

As described above, an acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items—either directly or through instancing. And as mentioned above, in example implementations, intermediate bounding volumes can be designated alternate root nodes or alternate root complets in example embodiments.

The items in the leaf nodes could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor upon reaching an intersecting leaf node tests rays against the primitives associated with the leaf node to determine which object surfaces the rays intersect and which object surfaces are visible along the ray.

Building a BVH can occur in two parts: static and dynamic. In many applications, a complex scene is preprocessed and the BVH is created based on static geometry of the scene. Then, using interactive graphics generation including dynamically created and manipulated moving objects, another part of the BVH (i.e., some or all of the BLAS or an additional, linked BVH(es) can be built in real time (e.g., in each frame) by driver or other software running on the real time interactive graphics system. BVH construction need not be hardware accelerated (although it may be in some non-limiting embodiments) but may implemented using highly-optimized software routines running on SMs 132 and/or CPU 120 and/or other development systems e.g., during development of an application. Thus, BVH construction may be accelerated by running it on one or more GPUs.

This process can thus be executed under software control on processor 120 and/or GPU 130 (see FIG. 9 discussed below) based on instructions stored in non-transitory storage. The general manner in which a BVH builder constructs the AS is known as described for example in Lauterbach et al, "Fast BVH Construction on GPUs" Volume 28 Number EUROGRAPHICS 2009; Karras, "Maximizing Parallelism in the Construction of BVHs, Octrees, and k-d Trees" (High Performance Graphics (2012).

Already subdivided bounding volumes that do include at least one portion of the geometry in a scene can be still further recursively subdivided—like the emergence of each of a succession of littler and littler cats from the hats of Dr. Seuss's' The Cat In The Hat Comes Back (1958). The number and configurations of recursive subdivisions will depend on the complexity and configuration of the 3D object being modeled as well as other factors such as desired resolution, distance of the object from the viewpoint, etc. One example subdivision scheme is a so-called 8-ary subdivision or "octree" in which each volume is subdivided into eight smaller volumes of uniform size, but many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607. It should be noted however that a typical BVH builder typically often works from the "bottom up", i.e., defining the bounding volumes for the leaf nodes and then creating bounding volumes for upper levels of the BVH by performing a union of lower level bounding volumes. However, in example embodiments, such upper levels of the BVH can be created using bounding boxes in typical object space even when lower or leaf nodes are defined using shear transforms, in order to avoid the need to apply shear transforms at the upper level. This is helpful in example non-limiting embodiments given that in one example approach, the shear transforms are localized to particular complets and do not carry over to other complets at upper or lower levels unless the BVH builder so specifies.

At some level of subdivision (which can be different levels for different parts of the BVH), the BVH construction process encounters geometry making up the encapsulated object being modeled. Using the analogy of a tree, the successive volumetric subdivisions are the trunk, branches, boughs and twigs, and the geometric is finally revealed at the very tips of the tree, namely the leaves. At this point, the BVH construction process also decides or is instructed on instancing to avoid duplicate or redundant geometric specifications in the acceleration structure, thereby conserving memory space and associated memory bandwidth.

FIG. 7 shows a BVH construction process, which may be specified by a set of instructions stored in non-transitory memory and executed by a processor such as a CPU and/or a GPU. The first stage (FIG. 7, block 202) in BVH acceleration structure construction acquires the bounding boxes of the referenced geometry (FIG. 7, 204). This is achieved by executing for each geometric primitive in an object a bounding box procedure that returns a conservative axis-aligned bounding box (AABB) for its input primitive. Aligning bounding boxes with the axes of the relevant coordinate systems for the geometry provides for increased efficiency of real time geometrical operations such as intersection testing and coordinate transforms as compared for example to oriented bounding boxes (OBB's), bounding spheres, or other approaches. Furthermore, the present technology enables the BVH builder to apply shear transforms to the bounding boxes of certain geometry in order to increase efficiency (FIG. 7, block 208). Those skilled in the art will understand that the example non-limiting approaches and associated wide complet representations described herein can also be applied to more expensive bounding constructs such as OBBs, bounding spheres and other bounding volume technology. On the other hand, depending on the shape of the underlying geometry, using AABB bounding volumes may provide efficiencies.

FIG. 7A shows one example non-limiting process that the BVH builder can perform for a leaf node. In this one-limiting simplified example, the BVH builder once started (FIG. 7A block 2002) can get referenced geometry and construct AABB bounding boxes in object space in the normal fashion (block 2004). If the fit is poor (block 2006), the BVH builder can shear the bounding volumes to see if the fit is predicted to be better (block 2010).

If the fit is predicted to be better, the BVH builder can select a quantized shear transform and associated power-of-two coefficients that approximate the sheared bounding boxes (block 2012), and adjust the sheared bounding box coordinates to provide AABB bounding volumes in the shear space that are defined by the selected quantized shear transform and associated coefficients (block 2016). The BVH builder may then write out the adjusted AABB bounding box coordinates in shear space along with a code indicating the inverted selected quantized shear transform and a code indicating the power-of-two coefficients (block 2016) to a complet for use in "just in time" transformation of the ray being applied to the complet.

Those skilled in the art will understand that more efficient algorithms might analyze the geometry to predict that a particular quantized shear transform would significantly improve efficiency for the particular geometry, group together geometry into the same complet that would significantly benefit from a common shear transform, or use other techniques such as multi-box and/or instancing in combination with shear transforms for the complet. Such algorithms could use empirical methods and/or artificial intelligence to identify candidate geometry that might benefit from use of the shear transform.

This process continues until all bounding volumes containing geometry have been sufficiently subdivided to provide a reasonable number of geometric primitives per bounding box (FIG. 7, 210). The real time ray tracer that uses the BVH will determine ray-primitive intersections by comparing the spatial xyz coordinates of the vertices of each primitive with the xyz coordinates of the ray to determine whether the ray and the surface the primitive defines occupy the same space. The ray-primitive intersection test can be computationally intensive because there may be many triangles to test. In many cases, it may be more efficient to further volumetrically subdivide and thereby limit the number of primitives in any "leaf node" to something like 16 or fewer.

The resulting compressed tree comprising compressed treelets or "complets" is written out into a data structure in memory for later use by the graphics processing hardware/software during e.g., real time graphics processing that includes real time ray tracing (FIG. 7, 212, 214).

FIGS. 8A and 8B show a recursively-subdivided bounding volume of a 3D scene (FIG. 8A) and a corresponding tree data structure (FIG. 8B) that may be accessed by the ray tracer and used for hardware-accelerated operations. The tree data structure may be stored in memory and retrieved on demand based on queries.

The division of the bounding volumes may be represented in a hierarchical tree data structure with the large bounding volume represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure includes a plurality of nodes arranged in a hierarchy. The root nodes N1 of the tree structure correspond to bounding volume N1 enclosing all of the primitives O1-O8. The root node N1 may identify the vertices of the bounding volume N1 and children nodes of the root node.

In FIG. 8A, bounding volume N1 is subdivided into bounding volumes N2 and N3. Children nodes N2 and N3 of the tree structure of FIG. 8B correspond to and represent the bounding volumes N2 and N3 shown in FIG. 8A. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 7B tree structure correspond to and represent the FIG. 8A bounding volumes N4, N5, N6, N8, N10 and N11 in space.

Figure 2A:
FIG. 2A shows how geometry that is axis-aligned can be bound tightly with an axis-aligned bounding box.

The FIG. 8B tree in this particular example is only three to six levels deep so that volumes N4, N5, N6, N8, N10 and N11 constitute "leaf nodes"—that is, nodes in the tree that have no child nodes. FIG. 8A shows that leaf node bounding volumes N4, N6, and N8 each contains two triangles of the geometry in the scene. For example, volumetric subdivision N4 contains triangles O1 & O2; volumetric subdivision N6 contains trials O5 & O6; and volumetric subdivision N8 contains triangles O7 & O8. FIG. 8A further shows that leaf node bounding volume N5 contains a single cylinder O3 such as shown in FIG. 2A that does not provide a good fit for the AABB bounding volume N5 shown in dotted lines. Accordingly, in an example non-limiting embodiment that uses Multi-Box described above, instead of using the larger AABB bounding volume N5 for the ray-bounding volume intersection test, TTU 138 instead tests the ray against a plurality of smaller AABB bounding volumes that are arranged, positioned, dimensioned and oriented to more closely fit cylinder O3.

The tree structure shown in FIG. 8B represents these leaf nodes N4, N5, N6, and N7 by associating them with the appropriate ones of primitive O1-O8 of the scene geometry. To access this scene geometry, the TTU 138 traverses the tree data structure of FIG. 8B down to the leaf nodes. In general, different parts of the tree can and will have different depths and contain different numbers of primitives. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space) to the coordinate space of N7 etc. (e.g., object space). As described herein, some implementations can "hoist" bounding volumes from the (object) coordinate space of N7 to the (world) coordinate space of N1-N3 in order to in some cases avoid the need for performing such transforms. Similarly, the BVH can selectively apply shear transforms to AABBs of certain geometry to achieve better fit between the geometry and the AABBs, and encode the AS accordingly so that rays to be tested against those sheared AABBs are first transformed into shear space.

Example Real Time Ray Tracing Hardware Accelerated Implementation

The acceleration structure constructed as described above can be used to advantage by software based graphics pipeline processes running on a conventional general purpose computer. However, the presently disclosed non-limiting embodiments advantageously implement the above-described techniques in the context of a hardware-based graphics processing unit including a high performance processors such as one or more streaming multiprocessors ("SMs") and one or more traversal co-processors or "tree traversal units" ("TTUs")—subunits of one or a group of streaming multiprocessor SMs of a 3D graphics processing pipeline, that is capable of providing complet intersection tests on ASes as described herein. The following describes the overall structure and operation of such as system including a TTU 138 that accelerates certain processes supporting interactive ray tracing including ray-bounding volume intersection tests, ray-primitive intersection tests and ray "instance" transforms for real time ray tracing and other applications. See e.g., U.S. Pat. Nos. 11,328,472; 11,302,056; 11,295,508; 11,282,261; 11,200,725; 11,189,075; 11,164,360; 11,157,414; 11,138,009; 11,113,790; 10,885,698; 10,867,429; 10,866,990; 10,825,232; 10,825,230; 10,810,785; 10,740,952; 10,580,196; 10,242,485; 10,235,338; 10,032,289; 10,025,879; 9,582,607; 9,569,559; US20160070820; US20160070767; https://www.nvidia.com/en-us/geforce/rtx/.

Example System Block Diagram

FIG. 9 illustrates an example real time ray interactive tracing graphics system 100 for generating images using three dimensional (3D) data of a scene or object(s) including the acceleration data structure constructed as described above.

System 100 includes an input device 110, a processor(s) 120, a graphics processing unit(s) (GPU(s)) 130, memory 140, and a display(s) 150. The system shown in FIG. 9 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 120 may be a multicore central processing unit (CPU) operable to execute an application in real time interactive response to input device 110, the output of which includes images for display on display 150. Display 150 may be any kind of display such as a stationary display, a head mounted display such as display glasses or goggles, other types of wearable displays, a handheld display, a vehicle mounted display, etc. For example, the processor 120 may execute an application based on inputs received from the input device 110 (e.g., a joystick, an inertial sensor, an ambient light sensor, etc.) and instruct the GPU 130 to generate images showing application progress for display on the display 150.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Furthermore, images generated applying one or more of the techniques disclosed herein may be used to display or convey information about a virtual environment such as the metaverse, Omniverse, or a digital twin of a real environment. Furthermore, Images generated applying one or more of the techniques disclosed herein may be used to display or convey information on a variety of devices including a personal computer (e.g., a laptop), an Internet of Things (IoT) device, a handheld device (e.g., smartphone), a vehicle, a robot, or any device that includes a display.

Based on execution of the application on processor 120, the processor may issue instructions for the GPU 130 to generate images using 3D data stored in memory 140. The GPU 130 includes specialized hardware for accelerating the generation of images in real time. For example, the GPU 130 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 120, which may have multiple cores with lots of cache memory that can handle a few software threads at a time, the GPU 130 may include hundreds or thousands of processing cores or "streaming multiprocessors" (SMs) 132 running in parallel.

In one example embodiment, the GPU 130 includes a plurality of programmable high performance processors that can be referred to as "streaming multiprocessors" ("SMs") 132, and a hardware-based graphics pipeline including a graphics primitive engine 134 and a raster engine 136. These components of the GPU 130 are configured to perform real-time image rendering using a technique called "scan conversion rasterization" to display three-dimensional scenes on a two-dimensional display 150. In rasterization, geometric building blocks (e.g., points, lines, triangles, quads, meshes, etc.) of a 3D scene are mapped to pixels of the display (often via a frame buffer memory).

The GPU 130 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 150 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 150.

To enable the GPU 130 to perform ray tracing in real time in an efficient manner, the GPU provides one or more "TTUs" 138 coupled to one or more SMs 132. The TTU 138 includes hardware components configured to perform (or accelerate) operations commonly utilized in ray tracing algorithms. A goal of the TTU 138 is to accelerate operations used in ray tracing to such an extent that it brings the power of ray tracing to real-time graphics application (e.g., games), enabling high-quality shadows, reflections, and global illumination. Results produced by the TTU 138 may be used together with or as an alternative to other graphics related operations performed in the GPU 130.

More specifically, SMs 132 and the TTU 138 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 132 working with TTU 138 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the TTU 138 is capable of accelerating in hardware certain of the more computationally-intensive aspects of that process.

Given a BVH constructed as described above, the TTU 138 performs a tree search where each node in the tree visited by the ray has a bounding volume for each descendent branch or leaf, and the ray only visits the descendent branches or leaves whose corresponding bound volume it intersects. In this way, TTU 138 explicitly tests only a small number of primitives for intersection, namely those that reside in leaf nodes intersected by the ray. In the example non-limiting embodiments, the TTU 138 accelerates both tree traversal (including the ray-volume tests) and ray-primitive tests. As part of traversal, it can also handle at least one level of instance transforms, transforming a ray from world-space coordinates into the coordinate system of an instanced mesh. In the example non-limiting embodiments, the TTU 138 does all of this in MIMD fashion, meaning that rays are handled independently once inside the TTU.

In the example non-limiting embodiments, the TTU 138 operates as a servant (coprocessor) to the SMs (streaming multiprocessors) 132. In other words, the TTU 138 in example non-limiting embodiments does not operate independently, but instead follows the commands of the SMs 132 to perform certain computationally-intensive ray tracing related tasks much more efficiently than the SMs 132 could perform themselves. In other embodiments or architectures, the TTU 138 could have more or less autonomy.

In the examples shown, the TTU 138 receives commands via SM 132 instructions and writes results back to an SM register file. For many common use cases (e.g., opaque triangles with at most one level of instancing), the TTU 138 can service the ray tracing query without further interaction with the SM 132. More complicated queries (e.g., involving alpha-tested triangles, primitives other than triangles, or multiple levels of instancing) may require multiple round trips (although the technology herein reduces the need for such "round trips" for certain kinds of geometry by providing the TTU 138 with enhanced capabilities to autonomously perform ray-bounding-volume intersection testing without the need to ask the calling SM for help). In addition to tracing rays, the TTU 138 is capable of performing more general spatial queries where an AABB or the extruded volume between two AABBs (which we call a "beam") takes the place of the ray. Thus, while the TTU 138 is especially adapted to accelerate ray tracing related tasks, it can also be used to perform tasks other than ray tracing.

The TTU 138 thus autonomously performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached.

Once the TTU 138 traverses the acceleration data structure to reach a terminal or "leaf" node (which may be represented by one or multiple bounding volumes) that intersects the ray and contains a geometric primitive, it performs an accelerated ray-primitive intersection test to determine whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray). See e.g., Lefrancois et al, NVIDIA Vulkan Ray Tracing Tutorial, December 2019, https://developer.nvidia.com/rtx/raytracing/vkray As mentioned above, the TTU 138 also accelerates the transform of each ray from world space into object space (and/or some other space) to obtain finer and finer bounding box encapsulations of the primitives and reduce the duplication of those primitives across the scene. See for example U.S. Pat. No. 11,282,261. As described above, objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives. Transforming rays from world space into shear space for particular complets can provide similar advantages.

Example Ray Tracing Processes

FIG. 10 shows an exemplary ray tracing shading pipeline 900 that may be performed by SM 132 and accelerated by TTU 138. The ray tracing shading pipeline 900 starts by an SM 132 invoking ray generation 910 and issuing a corresponding ray tracing request to the TTU 138. The ray tracing request identifies a single ray cast into the scene and asks the TTU 138 to search for intersections with an acceleration data structure the SM 132 also specifies. The TTU 138 traverses (FIG. 10 block 920) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 138 ray-primitive test block 720 performs an intersection 930 process to determine whether the ray intersects the primitives. The TTU 138 returns intersection information to the SM 132, which may perform an "any hit" shading operation 940 in response to the intersection determination. For example, the SM 132 may perform (or have other hardware perform) a texture lookup for an intersected primitive and decide based on the appropriate texel's value how to shade a pixel visualizing the ray. The SM 132 keeps track of such results since the TTU 138 may return multiple intersections with different geometry in the scene in arbitrary order.

FIG. 11 is a flowchart summarizing example ray tracing operations the TTU 138 performs as described above in cooperation with SM(s) 132. The FIG. 11 operations are performed by TTU 138 in cooperation with its interaction with an SM 132. The TTU 138 may thus receive the identification of a ray from the SM 132 and traversal state enumerating one or more nodes in one or more BVH's that the ray must traverse. The TTU 138 determines which bounding volumes of a BVH data structure the ray intersects (the "ray-complet" test 512). The TTU 138 can also subsequently determine whether the ray intersects one or more primitives in the intersected bounding volumes and which triangles are intersected (the "ray-primitive test" 520)—or the SM 132 can perform this test in software if it is too complicated for the TTU to perform itself. In example non-limiting embodiments, complets specify root or interior nodes (i.e., volumes) of the bounding volume hierarchy with children that are other complets or leaf nodes of a single type per complet.

First, the TTU 138 inspects the traversal state of the ray. If a stack the TTU 138 maintains for the ray is empty, then traversal is complete. If there is an entry on the top of the stack, the traversal co-processor 138 issues a request to the memory subsystem to retrieve that node. The traversal co-processor 138 then performs a bounding box test 512 to determine if a bounding volume of a BVH data structure is intersected by a particular ray the SM 132 specifies (step 512, 514). If the bounding box test determines that the bounding volume is not intersected by the ray ("No" in step 514), then there is no need to perform any further testing for visualization and the TTU 138 can return this result to the requesting SM 132. This is because if a ray misses a bounding volume (as in FIG. 1A with respect to bounding volume 310), then the ray will miss all other smaller bounding volumes inside the bounding volume being tested and any primitives that bounding volume contains.

If the bounding box test performed by the TTU 138 reveals that the bounding volume is intersected by the ray ("Yes" in Step 514), then the TTU determines if the bounding volume can be subdivided into smaller bounding volumes (step 518). In one example embodiment, the TTU 138 isn't necessarily performing any subdivision itself. Rather, each node in the BVH has one or more children (where each child is a leaf or a branch in the BVH). For each child, there is one or more bounding volumes and a pointer that leads to a branch or a leaf node. When a ray processes a node using TTU 138, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The TTU 138 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 518), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 514 while other bounding volumes may result in still further and further subdivisions being tested for intersection by TTU 138 recursively applying steps 512-518.

Ray-Geometry Intersection Testing

Once the TTU 138 determines that the bounding volumes intersected by the ray are leaf nodes ("No" in step 518), the TTU 138 and/or SM 132 performs a primitive (e.g., triangle) intersection test 520 to determine whether the ray intersects primitives in the intersected bounding volumes and which primitives the ray intersects. The TTU 138 thus performs a depth-first traversal of intersected descendent branch nodes until leaf nodes are reached. The TTU 138 processes the leaf nodes. If the leaf nodes are primitive ranges, the TTU 138 or the SM 132 tests them against the ray. If the leaf nodes are instance nodes, the TTU 138 or the SM 132 applies the instance transform. If the leaf nodes are specified as shear transform nodes, the TTU 138 applies the shear transform before testing against the ray. If the leaf nodes are item ranges, the TTU 138 returns them to the requesting SM 132. In the example non-limiting embodiments, the SM 132 can command the TTU 138 to perform different kinds of ray-primitive intersection tests and report different results depending on the operations coming from an application (or an software stack the application is running on) and relayed by the SM to the TTU. For example, the SM 132 can command the TTU 138 to report the nearest visible primitive revealed by the intersection test, or to report all primitives the ray intersects irrespective of whether they are the nearest visible primitive. The SM 132 can use these different results for different kinds of visualization. Or the SM 132 can perform the ray-primitive intersection test itself once the TTU 138 has reported the ray-complet test results. Once the TTU 138 is done processing the leaf nodes, there may be other branch nodes (pushed earlier onto the ray's stack) to test.

Example Non-Limiting TTU 138 Hardware Implementation

FIG. 12 shows an example simplified block diagram of TTU 138 including hardware configured to perform accelerated traversal operations as described above. In some embodiments, the TTU 138 may perform a depth-first traversal of a bounding volume hierarchy using a short stack traversal with intersection testing of supported leaf node primitives and mid-traversal return of alpha primitives and unsupported leaf node primitives (items). The TTU 138 includes dedicated hardware to determine whether a ray intersects bounding volumes and dedicated hardware to determine whether a ray intersects primitives of the tree data structure.

In more detail, TTU 138 includes an intersection management block 722, a ray management block 730 and a stack management block 740. Each of these blocks (and all of the other blocks in FIG. 12) may constitute dedicated hardware implemented by logic gates, registers, hardware-embedded lookup tables or other combinatorial logic, etc.

The ray management block 730 is responsible for managing information about and performing operations concerning a ray specified by an SM 132 to the ray management block. The stack management block 740 works in conjunction with traversal logic 712 to manage information about and perform operations related to traversal of a BVH acceleration data structure. Traversal logic 712 is directed by results of a ray-complet test block 710 that tests intersections between the ray indicated by the ray management block 730 and volumetric subdivisions represented by the BVH, using instance transforms as needed. The ray-complet test block 710 retrieves additional information concerning the BVH from memory 140 via an L0 complet cache 752 that is part of the TTU 138. The results of the ray-complet test block 710 informs the traversal logic 712 as to whether further recursive traversals are needed. The stack management block 740 maintains stacks to keep track of state information as the traversal logic 712 traverses from one level of the BVH to another, with the stack management block 740 pushing items onto the stack as the traversal logic traverses deeper into the BVH and popping items from the stack as the traversal logic traverses upwards in the BVH. The stack management block 740 is able to provide state information (e.g., intermediate or final results) to the requesting SM 132 at any time the SM requests.

The intersection management block 722 manages information about and performs operations concerning intersections between rays and primitives, using instance transforms as needed. The ray-primitive test block 720 retrieves information concerning geometry from memory 140 on an as-needed basis via an L0 primitive cache 754 that is part of TTU 138. The intersection management block 722 is informed by results of intersection tests the ray-primitive test and transform block 720 performs. Thus, the ray-primitive test and transform block 720 provides intersection results to the intersection management block 722, which reports geometry hits and intersections to the requesting SM 132. In one embodiment, the ray-primitive test is performed on axis-aligned bounding boxes, using a pair of coordinates within a coordinate space to specify each bounding box and testing the ray (which may be transformed into the testing coordinate system) using simple fast calculators that take advantage of the bounding box axis alignment.

A Stack Management Unit 740 inspects the traversal state to determine what type of data needs to be retrieved and which data path (complet or primitive) will consume it. The intersections for the bounding volumes are determined in the ray-complet test path of the TTU 138 including one or more ray-complet test blocks 710 and one or more traversal logic blocks 712. A complet specifies root or interior nodes of a bounding volume. Thus, a complet may define one or more bounding volumes for the ray-complet test. In example embodiments herein, a complet may define a plurality of "child" bounding volumes that (whether or not they represent leaf nodes) that don't necessarily each have descendants but which the TTU will test in parallel for ray-bounding volume intersection to determine whether geometric primitives associated with the plurality of bounding volumes need to be tested for intersection.

The ray-complet test path of the TTU 138 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 720 and one or more intersection management blocks 722.

The TTU 138 receives queries from one or more SMs 132 to perform tree traversal operations. The query may request whether a ray intersects bounding volumes and/or primitives in a BVH data structure. The query may identify a ray (e.g., origin, direction, and length of the ray) and a BVH data structure and traversal state (short stack) which includes one or more entries referencing nodes in one or more Bounding Volume Hierarchies that the ray is to visit. The query may also include information for how the ray is to handle specific types of intersections during traversal. The ray information may be stored in the ray management block 730. The stored ray information (e.g., ray length) may be updated based on the results of the ray-primitive test.

The TTU 138 may request the BVH data structure identified in the query to be retrieved from memory outside of the TTU 138. Retrieved portions of the BVH data structure may be cached in the level-zero (L0) cache 750 within the TTU 138 so the information is available for other time-coherent TTU operations, thereby reducing memory 140 accesses. Portions of the BVH data structure needed for the ray-complet test may be stored in a L0 complet cache 752 and portions of the BVH data structure needed for the ray-primitive test may be stored in an L0 primitive cache 754.

After the complet information needed for a requested traversal step is available in the complet cache 752, the ray-complet test block 710 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 138 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 712 to traverse down to the next level of the BVH). These steps are repeated recursively until intersected leaf nodes of the BVH are encountered The ray-complet test block 710 may provide ray-complet intersections to the traversal logic 712. Using the results of the ray-complet test, the traversal logic 712 creates stack entries to be pushed to the stack management block 740. The stack entries may indicate internal nodes (i.e., a node that includes one or more child nodes) that need to be further tested for ray intersections by the ray-complet test block 710 and/or triangles identified in an intersected leaf node that need to be tested for ray intersections by the ray-primitive test and transform block 720. The ray-complet test block 710 may repeat the traversal on internal nodes identified in the stack to determine all leaf nodes in the BVH that the ray intersects. The precise tests the ray-complet test block 710 performs will in the example non-limiting embodiment be determined by mode bits, ray operations (see below) and culling of hits, and the TTU 138 may return intermediate as well as final results to the SM 132.

Example Hardware Implementation for Shear Transform Related Ray-Complet Operations In our implementation in the Tree Traversal Unit (TTU), rather than shearing the AABB, the ray-complet test (RCT) unit 710 instead applies the inverse shear transform to the ray. Because the shear transform is an invertible transform, testing a ray against a sheared AABB is functionally equivalent to testing the inverse-sheared ray against the original, unsheared AABB.

Shearing a ray instead of an AABB requires far less math because a sheared ray need only transform origin and direction whereas a sheared AABB needs to transform all 6 vertices of the box. Additionally, RCT 710 in one embodiment does a wide test (up to 12 boxes in implementations), and the shear would need to be applied to either all 12 boxes or just the single ray. Therefore, by shearing the ray instead of the AABB, RCT 710 achieves the same functional result with far fewer hardware resources by a ratio of 36×.

Note that shearing the ray in this context is a different operation than the transform used for instancing. A sheared complet is not a change into a new object space, but rather a shear space local only to that complet. That is, the sheared ray does not persist beyond the testing of the single complet and, as discussed above, the sheared ray is also not used for testing against the geometry if the ray-geometry intersection test must be performed.

It is noteworthy that an instance node transform is a much heavier operation. When a node is intersected in the top-level acceleration structure (TLAS), aka instance acceleration structure (IAS), the TTU loads an instance node in the ray-triangle test (RTT) unit transforms the ray into object space, stores the object space ray in the ray management unit (RMU), and starts a new traversal stack in the stack management unit (SMU).

For the shear transform described here, no instance node is required, no new ray is stored, and the current traversal stack is maintained.

For each ray-complet test to be performed, RCT 710 receives ray data from the RMU and complet data from the L0 Complet Cache (L0CC). If the complet is marked as a sheared complet, RCT extracts a 4-bit shearSelect value, a 4-bit shearCoeff0 value, and a 4-bit shearCoeff1 value from the complet data. The exact location of this data within the complet is not important, though minor encoding changes or adjustments may be provided for some existing fields.

A lookup table in the form of "shearSelect" bits specify different options of the shear transform to be applied to the ray (see FIG. 14). In this particular example, if the "shearSelect" value is 0000, a shear transform of the x coordinate/dimension is selected. Similarly, if the "shearSelect" value is 0001, a shear transform of the y coordinate/dimension is selected; and if the "shearSelect" value is 0010, a shear transform of the z coordinate/dimension is selected. These encodings each select two coefficients to transform as well as the form of the transform.

In the example shown, additional two-dimensional options are also selectable. In particular, "0011", "0100" and "0101" select different two-dimensional versions of the shear transform (xy, yz and xz, respectively) which can be performed with only two (specified) coefficients, as explained above. These transform options enable the BVH builder to use and apply shear transforms based on sums of plural powers of two. In one implementation, these are computed by the FIG. 13 hardware using the FADD taking the same input on both of its inputs but with a different coefficient applied to it. For example, $3/8=1/4+1/8$ or $3/8=1/2-1/8$; and $7/8=1-1/8$. This provides additional flexibility to have some coefficient values that are not themselves powers of 2 but can be efficiently calculated (integer 8-bit addition, which also provides subtraction by adding a negative value) from two values that are powers of two. Such additional flexibility allows the BVH builder to devise tighter fits than if it were truly restricted to using only coefficients that are powers of 2.

The remaining FIG. 13 encodings shown select shear transforms that are based on a single coefficient that is multiplied by one axis coordinate and added to another axis coordinate—which can be computed efficiently with the hardware-implemented calculator of FIG. 13. These selections avoid the need to store zero as a coefficient value (a zero coefficient is implied), providing an economy in the number of bits needed for encoding the shear transform in the complet storage. Thus, instead of encoding a 0 value for the shear coefficients, the shearSelect of FIG. 14 in one embodiment introduces 6 single-coefficient modes, 8 through 13, that have an implicit 0 already applied. This optimization removes the need to encode a shift coefficient value of 0, reducing the bits needed to encode each shear coefficient to 4 bits instead of 5 bits while increasing the shearSelect by only 1 bit. The net savings is 1 bit of encoding, which is useful when complet bit count is limited. Alternative implementations could encode 0 directly and not use the six extended single-coefficient shear transforms. For the single coefficient transforms, only shearCoeff0 is used.

The encoding table shown thus provides many different shear transform options for the BVH builder while keeping the number of encoding bits small (in this case, 4 bits). In this embodiment, the table does not offer encoding any general 3D shear transform or even a general 2D shear transform because the corresponding coefficient storage and calculations were deemed too expensive for our implementation. Rather, we have intentionally diminished the power and flexibility of the shear transform in our implementation by providing a degraded set of possible versions of the transform that keep the implementation efficient while still providing a reasonably large set of shear transform options for the BVH builder to choose from in order to avoid many or even most egregious cases of poor fit between certain kinds of geometry and AABBs. Those skilled in the art will understand that other choices could be made for different implementations.

In this example, the shearCoeff0 and shearCoeff1 encode the numerical values of the two shear transform coefficients (see FIG. 15). Note that these are optimized in this embodiment in that 0 is not included in the coefficients, and the shear select has more modes than previously discussed. As explained above, the coefficient values shown in FIG. 15 are constrained to be powers of 2 (with additions) such as shown in FIG. 6A, which can be efficiently computed with the FIG. 13 hardware using 8-bit integer exponent adds (with minimal extra logic to handle subnormals, NaN, and infinity conditions) and a full floating point add ("FADD"). In one embodiment, this computation can be implemented at significantly less area cost than a multiply due to constraining the multiplication operation to be only powers of two and therefore only requiring small adders to adjust the exponent values. Other implementations are possible.

In one embodiment, if the complet is a sheared complet, the shearSelect, shearCoeff0, and shearCoeff1 bits are decoded into control bits for two parallel ray shearing pipelines located at the top of RCT 710 (FIG. 16). Each pipeline shears the origin and direction for one component of the ray using the FSCADD and FADD units as described previously and shown in FIG. 13. In this example, the FIG. 13 hardware is replicated to provide parallel shear transform calculations for plural ray components each including an origin and a direction. In one embodiment, the ray-complet test uses reciprocal ray directions, so each pipeline also computes the reciprocal of its sheared ray direction. The direction is different in this embodiment is because the ray-complet test divides by the ray direction rather than multiplying by it. This division is performed by multiplying by the reciprocal, which means that the FIG. 16 computation structure is responsible for deriving the reciprocal. The reciprocal calculation and its associated latency can be bypassed (see FIG. 17 discussion below) if the complet does not request or require a shear transform calculation. One skilled in the art will understand that other implementations are possible based on different contexts, environments and constraints.

In this embodiment, the third ray component is not sheared but rather passed directly to the ray-complet test without modification.

In one embodiment, the ray-complet (12-wide ray-AABB) test is performed with the sheared ray and the AABBs of all the complet's valid children. The resulting intersections may be handled as usual. The transformed ray is not stored or used beyond this test.

As FIG. 17 shows, if the complet is not a sheared complet, the ray shearing pipelines are bypassed (see bypass MUX or multiplexer that is selected or deselected by a "shear" bit supplied by or decoded from the complet) and the ray-complet test is performed with the original ray. This bypass allows non-sheared complets to avoid the latency of the ray shearing pipelines and maintain their existing performance.

FIG. 17 also shows an example form of shear related values the BVH builder stores in each complet that requests or requires a shear transform. Such a complet format that uses the shear transform in one embodiment may present to RCT 710 the following shear related values:

| shearSelect (FIG. 14) | $1^{st}$ & $2^{nd}$ shearCoeffs (FIG. 15) | Shear flag (indicates the complet is a "sheared complet" needs or uses a shear transform) | AABB coefficients of the sheared bounding volume |
|---|---|---|---|

In one embodiment, shearing is performed complet by complet, and some complets that are not "shear complets" do not include these shear related values. In other embodiments, complet encodings that use bounding box efficiency features in addition to shear transforms can include both the shear transform related values and additional values related to such other bounding box efficiency features.

In an example embodiment, each complet can encode more than one object (for example, some complets may encode many objects such as 12 or more). However, in our non-limiting implementation in order to conserve storage space, each complet specifies at most only a single shear transform. To deal with this constraint, the BVH builder can realize increased system performance by packing a given complet with objects that all benefit from using the same common shear transform. This might mean for example that the BVH builder could pack a complet with hair or grass objects that all point in the same direction or are otherwise aligned with one another. Furthermore, when encoding different sorts of geometry (e.g., triangles in a mesh), the BVH builder could optimize the processing of a given complet by selecting a shear transform that may not be ideal for any one object the complet represents but which provides performance gains across most or all of those objects. In the example embodiment, the BVH can (and often does) choose not to use the shear transform at all (essentially turning the feature off for that complet) or to use the shear transform in combination with other techniques such as multibox, instancing, etc. It could also be possible in other implementations to include a shear flag per object in the complet so that objects could "opt in" or "opt out" of the shear transform—keeping in mind that in our implementation it is the ray that is shear transformed and the shear transformed ray is tested against each of the AABBs the complet specified. One skilled in the art will understand that other implementations could include a shear transform definition for each object in a complet, or otherwise include more than one shear transform definition in any given complet. It should be noted that the use of the shear transform as described is not limited to complets of leaf nodes—it can be applied to complets specifying bounding volumes on any level of the BVH (such as tree levels above objects that are all oriented in the same direction, although other possibilities also may exist). In such alternative implementations, a way can be provided to recover the original ray such as is done with instance transforms. It would also be possible to transform the geometry into shear space and store the geometry in shear space, to thereby enable the ray-geometry test to proceed with the ray and geometry in the same shear space coordinate system. Such alternative implementations would not necessarily transform the ray into shear space "just in time" as in the embodiments described above, but could instead conduct all relevant tests (ray-box intersection test and ray-geometry intersection test) in shear space.

The technology herein thus augments the RCT sub-unit to support ray shearing before performing the ray-complet test, improving the efficiency of the test. Given an input complet, an incident ray, and a specific shear transform to apply, RCT first applies the shear transform to the incident ray and then performs ray-AABB tests with the sheared ray and the bounding boxes of the complet's children. The technology uses a shear transform to generate an improved axis-aligned bounding box for the ray-box test instead of using an oriented bounding box or multiple levels of instancing. The shear operation is also optimized for minimal encoding and minimal impact on data paths.

These operations can be made to be completely invisible to the application and the API—in terms of supporting software, only the BVH builder needs to be configured to selectively build complets that encode and specify shear transforms. Thus, the developer does not need to worry about new API commands or otherwise do anything differently. In terms of hardware modifications, they in one embodiment can be confined to the ray-box intersection test unit as described above. For a developer to test or detect whether shear space transforms are being used, the developer could run diagnostics that measure how long it takes for pixels to be developed based on the hardware operations. Such diagnostics when visualized could reveal sheared bounding boxes that would show that shear transforms are being used. It would also be possible for a developer to test whether quantized shear transform bounding boxes are being used by determining for example whether geometry having somewhat different orientations ends up being bounded by the same sheared bounding boxes.

Ray-Primitive Intersection Testing

Referring again to FIG. 12, the TTU 138 also has the ability to accelerate intersection tests that determine whether a ray intersects particular geometry or primitives enclosed by bounding volumes. For some cases in which the geometry is sufficiently complex (e.g., defined by procedural primitives such as curves or other abstract constructs as opposed to e.g., vertices) that TTU 138 in some embodiments may not be able to help with the ray-primitive intersection testing. In such cases, the TTU 138 simply reports the ray-complet intersection test results to the SM 132, and the SM 132 performs the ray-primitive intersection test itself. In other cases (e.g., triangles), the TTU 138 can perform the ray-triangle intersection test itself, thereby further increasing performance of the overall ray tracing process. For sake of completeness, the following describes how the TTU 138 can perform or accelerate the ray-primitive intersection testing.

As explained above, leaf nodes (found to be intersected by the ray identify (enclose) primitives that may or may not be intersected by the ray. One option is for the TTU 138 to provide e.g., a range of geometry identified in the intersected leaf nodes to the SM 132 for further processing. For example, the SM 132 may itself determine whether the identified primitives are intersected by the ray based on the information the TTU 138 provides as a result of the TTU traversing the BVH. To offload this processing from the SM 132 and thereby accelerate it using the hardware of the TTU 138, the stack management block 740 may issue requests for the ray-primitive and transform block 720 to perform a ray-primitive test for the primitives within intersected leaf nodes the TTU's ray-complet test block 710 identified. In some embodiments, the SM 132 may issue a request for the ray-primitive test to test a specific range of primitives and transform block 720 irrespective of how that geometry range was identified.

After making sure the primitive data needed for a requested ray-primitive test is available in the primitive cache 754, the ray-primitive and transform block 720 may determine primitives that are intersected by the ray using the ray information stored in the ray management block 730. The ray-primitive test block 720 provides the identification of primitives determined to be intersected by the ray to the intersection management block 722. In one embodiment, the sheared ray values previously calculated for the ray-box intersection test are not used for the ray-primitive test, and the original ray values are instead transformed into object space (not shear space) to perform the ray-primitive test.

The intersection management block 722 can return the results of the ray-primitive test to the SM 132. The results of the ray-primitive test may include identifiers of intersected primitives, the distance of intersections from the ray origin and other information concerning properties of the intersected primitives. In some embodiments, the intersection management block 722 may modify an existing ray-primitive test (e.g., by modifying the length of the ray) based on previous intersection results from the ray-primitive and transform block 720.

The intersection management block 722 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture and the way the texture modifies the triangle. For example, transparency (e.g., stained glass) in some embodiments requires the SM 132 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive—for example, cutting a leaf shape out of a triangle. (Note that in raster graphics, transparency is often called "alpha blending" and trimming is called "alpha test"). In other embodiments, the TTU 138 can push transparent hits to queues in memory for later handling by the SM 132 and directly handle trimmed triangles by sending requests to the texture unit. Each triangle may include a designator to indicate the triangle type. The intersection management block 722 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection for less complex geometry can be fully determined in the TTU 138 because the area of the opaque triangle blocks the ray from going past the surface of the triangle. For transparent triangles, ray intersections cannot in some embodiments be fully determined in the TTU 138 because TTU 138 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 720 determines are intersected may be sent to the SM 132, for the SM to make the full determination as to whether the triangle affects visibility along the ray.

The SM 132 can resolve whether or not the ray intersects a texture associated with the transparent triangle and/or whether the ray will be blocked by the texture. The SM 132 may in some cases send a modified query to the TTU 138 (e.g., shortening the ray if the ray is blocked by the texture) based on this determination. In one embodiment, the TTU 138 may be configured to return all triangles determined to intersect the ray to the SM 132 for further processing. Because returning every triangle intersection to the SM 132 for further processing is costly in terms of interface and thread synchronization, the TTU 138 may be configured to hide triangles which are intersected but are provably capable of being hidden without a functional impact on the resulting scene. For example, because the TTU 138 is provided with triangle type information (e.g., whether a triangle is opaque or transparent), the TTU 138 may use the triangle type information to determine intersected triangles that are occluded along the ray by another intersecting opaque triangle and which thus need not be included in the results because they will not affect the visibility along the ray. If the TTU 138 knows that a triangle is occluded along the ray by an opaque triangle, the occluded triangle can be hidden from the results without impact on visualization of the resulting scene.

The intersection management block 722 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 132.

In some embodiments, once an opaque triangle intersection is identified, the intersection management block 722 may shorten the ray stored in the ray management block 730 so that bounding volumes (which may include triangles) behind the intersected opaque triangle (along the ray) will not be identified as intersecting the ray.

The intersection management block 722 may store information about intersected transparent triangles in a separate queue. The stored information about intersected transparent triangles may be sent to the SM 132 for the SM to resolve whether or not the ray intersects a texture associated with the triangle and/or whether the texture blocks the ray. The SM may return the results of this determination to the TTU 138 and/or modify the query (e.g., shorten the ray if the ray is blocked by the texture) based on this determination.

As discussed above, the TTU 138 allows for quick traversal of an acceleration data structure (e.g., a BVH) to determine which primitives (e.g., triangles used for generating a scene) in the data structure are intersected by a query data structure (e.g., a ray). For example, the TTU 138 may determine which triangles in the acceleration data structure are intersected by the ray and return the results to the SM 132. However, returning to the SM 132 a result on every triangle intersection is costly in terms of interface and thread synchronization. The TTU 138 provides a hardware logic configured to hide those items or triangles which are provably capable of being hidden without a functional impact on the resulting scene. The reduction in returns of results to the SM and synchronization steps between threads greatly improves the overall performance of traversal. The example non-limiting embodiments of the TTU 138 disclosed in this application provides for some of the intersections to be discarded within the TTU 138 without SM 132 intervention so that less intersections are returned to the SM 132 and the SM 132 does not have to inspect all intersected triangles or item ranges.

Example Instancing Pipeline Implementation by TTU 138 and SM 132

As discussed above, one example feature of embodiments herein relates to hoisting GASes from BLAS to TLAS levels of the acceleration structure. This is commonly done in example embodiments through instance transforms, as explained above. For sake of completeness, the following describes how TTU 138 in example embodiments performs instancing and associated transforms.

The FIG. 18 more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 18 is essentially software-defined (which in example embodiments means it is determined by the SMs 132) but makes extensive use of hardware acceleration by TTU 138. Key components include the SM 132 (and the rest of the compute pipeline), the TTU 138 (which serves as a coprocessor to SM), and the L1 cache and downstream memory system, from which the TTU fetches BVH and triangle data.

The pipeline shown in FIG. 18 shows that bounding volume hierarchy creation 1002 can be performed ahead of time by a development system. It also shows that ray creation and distribution 1004 are performed or controlled by the SM 132 or other software in the example embodiment, as shading (which can include lighting and texturing). The example pipeline includes a "top level" BVH tree traversal 1006, ray transformation 1014, "bottom level" BVH tree traversal 1018, and a ray/triangle (or other primitive) intersection 1026 that are each performed by the TTU 138. These do not have to be performed in the order shown, as handshaking between the TTU 138 and the SM 132 determines what the TTU 138 does and in what order.

The SM 132 presents one or more rays to the TTU 138 at a time. Each ray the SM 132 presents to the TTU 138 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. The traversal stack may also be used by the SM 132 to communicate certain state information to the TTU 138 for use in the traversal. A new ray query may be started with an explicit traversal stack. For some queries, however, a small number of stack initializers may be provided for beginning the new query of a given type, such as, for example: traversal starting from a particular complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example embodiment, a set of mode flags the SM 132 presents with each query (e.g., ray) may at least partly control how the TTU 138 will process the query when the query intersects the bounding volume of a specific type or intersects a primitive of a specific primitive type. The mode flags the SM 132 provides to the TTU 138 enable the ability by the SM and/or the application to e.g., through a RayOp, specify an auxiliary arithmetic or logical test to suppress, override, or allow storage of an intersection. The mode flags may for example enable traversal behavior to be changed in accordance with such aspects as, for example, a depth (or distance) associated with each bounding volume and/or primitive, size of a bounding volume or primitive in relation to a distance from the origin or the ray, particular instances of an object, etc. This capability can be used by applications to dynamically and/or selectively enable/disable sets of objects for intersection testing versus specific sets or groups of queries, for example, to allow for different versions of models to be used when application state changes (for example, when doors open or close) or to provide different versions of a model which are selected as a function of the length of the ray to realize a form of geometric level of detail, or to allow specific sets of objects from certain classes of rays to make some layers visible or invisible in specific views.

In addition to the set of mode flags which may be specified separately for the ray-complet intersection and for ray-primitive intersections, the ray data structure may specify other RayOp test related parameters, such as ray flags, ray parameters and a RayOp test. The ray flags can be used by the TTU 138 to control various aspects of traversal behavior, back-face culling, and handling of the various child node types, subject to a pass/fail status of an optional RayOp test. RayOp tests add flexibility to the capabilities of the TTU 138, at the expense of some complexity. The TTU 138 reserves a "ray slot" for each active ray it is processing, and may store the ray flags, mode flags and/or the RayOp information in the corresponding ray slot buffer within the TTU during traversal.

In the example shown in FIG. 19A, the TTU 138 performs a top level tree traversal 1006 and a bottom level tree traversal 1018. In the example embodiment, the two level traversal of the BVH enables fast ray tracing responses to dynamic scene changes. As discussed above, it is possible to hoist complet information from the bottom level tree traversal 1018 to the top level tree traversal 1006. This enables alignment for a single primitive to be more tightly fit in its own object space, and then placed in a common world space e.g., via a transform by the BVH builder while reducing the number of instance transforms the TTU 138 needs to perform during real time ray tracing operations.

Ray transformation 1014 provides the appropriate transition from the top level tree traversal 1006 to the bottom level tree traversal 1018 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

Example Top Level Tree Traversal

The top level tree traversal 1006 by TTU 138 receives complets from the L1 cache 1012, and provides an instance to the ray transformation 1014 for transformation, or a miss/end output 1013 to the SM 132 for closest hit shader 1015 processing by the SM (this block can also operate recursively based on non-leaf nodes/no hit conditions). In the top level tree traversal 1006, a next complet fetch step 1008 fetches the next complet to be tested for ray intersection in step 1010 from the memory and/or cache hierarchy and ray-bounding volume intersection testing is done on the bounding volumes in the fetched complet.

As described above, an instance node connects one BVH to another BVH which is in a different coordinate system. When a child of the intersected bounding volume is an instance node, the ray transformation 1014 is able to retrieve an appropriate transform matrix from the L1 cache 1016. The TTU 138, using the appropriate transform matrix, transforms the ray to the coordinate system of the child BVH. U.S. patent application Ser. No. 14/697,480 describes transformation nodes that connect a first set of nodes in a tree to a second set of nodes where the first and second sets of nodes are in different coordinate systems. The instance nodes in example embodiments may be similar to the transformation nodes in U.S. application Ser. No. 14/697, 480. In an alternative, non-instancing mode of TTU 138 shown in FIG. 19B, the TTU does not execute a "bottom" level tree traversal 1018 and noninstanced tree BVH traversals are performed by blocks 1008, 1010 e.g., using only one stack. The TTU 138 can switch between the FIG. 19A instanced operations and the FIG. 19B non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1010 is performed on each bounding volume in the fetched complet before the next complet is fetched. Other embodiments may use other techniques, such as, for example, traversing the top level traversal BVH in a depth-first manner. U.S. Pat. No. 9,582, 607 describes one or more complet structures and contents that may be used in example embodiments. U.S. Pat. No. 9,582,607 also describes an example traversal of complets.

When a bounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 1006, and primitives to be tested for intersection, and a larger local stack data structure can be used to keep track of the traversal state in the bottom level tree traversal 1018.

Example Bottom Level Tree Traversal

In the bottom level tree traversal 1018, a next complet fetch step 1022 fetches the next complet to be tested for ray intersection in step 1024 from the memory and/or cache hierarchy 1020 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1006 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1026.

The leaf outputs of the bottom level tree traversal 1018 are provided to the ray/triangle intersection 1026 (which has L0 cache access as well as ability to retrieve triangles via the L1 cache 1028). The L0 complet and triangle caches may be small read-only caches internal to the TTU 138. The ray/ triangle intersection 1026 may also receive leaf outputs from the top level tree traversal 1006 when certain leaf nodes are reached without traversing an instanced BVH.

After all the primitives in the primitive range have been processed, the Intersection Management Unit inspects the state of the result Queue and crafts packets to send to the Stack Management Unit and/or Ray Management Unit to update the ray's attributes and traversal state, set up the ray's next traversal step, and/or return the ray to the SM 132 (if necessary). If the result queue contains opaque or alpha intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the resultQueue, whether one or more alpha intersections are present in the result queue, whether the resultQueue is full, whether additional alpha intersections were found in the primitive range that have not been returned to the SM and which are not present in the resultQueue, and the index of the next alpha primitive in the primitive range for the ray to test after the SM consumes the contents of the resultQueue (the index of the next primitive in the range after the alpha primitive with the highest memory-order from the current primitive range in the result queue).

When the Stack Management Unit 740 receives the packet from Intersection Management Unit 722, the Stack Management Unit 740 inspects the packet to determine the next action required to complete the traversal step and start the next one. If the packet from Intersection Management Unit 722 indicates an opaque intersection has been found in the primitive range and the ray mode bits indicate the ray is to finish traversal once any intersection has been found the Stack Management Unit 740 returns the ray and its results queue to the SM with traversal state indicating that traversal is complete (a done flag set and/or an empty top level and bottom level stack). If the packet from Intersection Management Unit 722 indicates that there are opaque or alpha intersection in the result queue and that there are remaining alpha intersections in the primitive range not present in the result queue that were encountered by the ray during the processing of the primitive range that have not already been returned to the SM, the Stack Management Unit 740 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 722 indicates that no opaque or alpha intersections were found when the ray processed the primitive range the Stack Management Unit 740 pops the top of stack entry (corresponding to the finished primitive range) off the active traversal stack. If the packet from Stack Management Unit 740 indicates or that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM, the Stack Management Unit 740 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 740 sets the active stack to the top stack. If the top stack is the active stack, and the active stack is empty, then the Stack Management Unit 740 returns the ray and its result queue to the SM with traversal state indicating that traversal is complete (a done flag set and/or an empty top level and bottom level stack). If the active stack contains one or more stack entries, then the Stack Management Unit 740 inspects the top stack entry and starts the next traversal step. Testing of primitive and/or primitive ranges for intersections with a ray and returning results to the SM 132 are described in co-pending U.S. application Ser. No. 16/101,148 entitled "Conservative Watertight Ray Triangle Intersection" and U.S. application Ser. No. 16/101,196 entitled "Method for Handling Out-of-Order Opaque and Alpha Ray/Primitive Intersections", which are hereby incorporated by reference in their entireties.

Example Image Generation Pipeline Including Ray Tracing

While the above disclosure is framed in the specific context of computer graphics and visualization, ray tracing and the disclosed TTU could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

For example, the ray tracing and other capabilities described above can be used in a variety of ways. For example, in addition to being used to render a scene using ray tracing, they may be implemented in combination with scan conversion techniques such as in the context of scan converting geometric building blocks (i.e., polygon primitives such as triangles) of a 3D model for generating image for display (e.g., on display 150 illustrated in FIG. 9).

Meanwhile, however, the technology herein provides advantages when used to produce images for virtual reality, augmented reality, mixed reality, video games, motion and still picture generation, and other visualization applications. FIG. 20 illustrates an example flowchart for processing primitives to provide image pixel values of an image, in accordance with an embodiment. An image of a 3D model may be generated in response to receiving a user input (Step 1652; see FIG. 9). The user input may be a request to display an image or image sequence, such as an input operation performed during interaction with an application (e.g., a game application). In response to the user input, the system performs scan conversion and rasterization of 3D model geometric primitives of a scene using conventional GPU 3D graphics pipeline (Step 1654). The scan conversion and rasterization of geometric primitives may include for example processing primitives of the 3D model to determine image pixel values using conventional techniques such as lighting, transforms, texture mapping, rasterization and the like as is well known to those skilled in the art. The generated pixel data may be written to a frame buffer.

In step 1656, one or more rays may be traced from one or more points on the rasterized primitives using TTU hardware acceleration. The rays may be traced in accordance with the one or more ray-tracing capabilities disclosed in this application. Based on the results of the ray tracing, the pixel values stored in the buffer may be modified (Step 1658). Modifying the pixel values may in some applications for example improve the image quality by, for example, applying more realistic reflections and/or shadows. An image is displayed (Step 1660) using the modified pixel values stored in the buffer.

In one example, scan conversion and rasterization of geometric primitives may be implemented using the processing system described above, and ray tracing may be implemented by the SM's 132 using the TTU architecture described in relation to FIG. 12, to add further visualization features (e.g., specular reflection, shadows, etc.). FIG. 20 is just a non-limiting example—the SM's 132 could employ the described TTU by itself without texture processing or other conventional 3D graphics processing to produce images, or the SM's could employ texture processing and other conventional 3D graphics processing without the described TTU to produce images. The SM's can also implement any desired image generation or other functionality in software depending on the application to provide any desired programmable functionality that is not bound to the hardware acceleration features provided by texture mapping hardware, tree traversal hardware or other graphics pipeline hardware.

The TTU 138 in some embodiments is stateless, meaning that no architectural state is maintained in the TTU between queries. At the same time, it is often useful for software running on the SM 1840 to request continuation of a previous query, which implies that relevant state should be written to registers by the TTU 138 and then passed back to the TTU in registers (often in-place) to continue. This state may take the form of a traversal stack that tracks progress in the traversal of the BVH.

A small number of stack initializers may also be provided for beginning a new query of a given type, for example:
  Traversal starting from a complet such as an alternate root complet
  Intersection of a ray with a range of triangles
  Intersection of a ray with a range of triangles, followed by traversal starting from a complet
  Vertex fetch from a triangle buffer for a given triangle
  Optional support for instance transforms in front of the "traversal starting from a complet" and "intersection of a ray with a range of triangles".

Vertex fetch is a simple query that may be specified with request data that consists of a stack initializer and nothing else. Other query types may require the specification of a ray or beam, along with the stack or stack initializer and various ray flags describing details of the query. A ray is given by its three-coordinate origin, three-coordinate direction, and minimum and maximum values for the t-parameter along the ray. A beam is additionally given by a second origin and direction.

Various ray flags can be used to control various aspects of traversal behavior, back-face culling, and handling of the various child node types, subject to a pass/fail status of an optional rayOp test. RayOps add considerable flexibility to the capabilities of the TTU. In some example embodiments, the RayOps portion introduces two Ray Flag versions can be dynamically selected based on a specified operation on data conveyed with the ray and data stored in the complet. To explore such flags, it's first helpful to understand the different types of child nodes allowed within a BVH, as well as the various hit types that the TTU 138 can return to the SM. Example node types are:
  A child complet (i.e., an internal node)
    By default, the TTU 138 continues traversal by descending into child complets.
  A triangle range, corresponding to a contiguous set of triangles within a triangle buffer
    (1) By default, triangle ranges encountered by a ray are handled natively by the TTU 138 by testing the triangles for intersection and shortening the ray accordingly. If traversal completes and a triangle was hit, default behavior is for the triangle ID to be returned to SM 1840, along with the t-value and barycentric coordinates of the intersection. This is the "Triangle" hit type.
    (2) By default, intersected triangles with the alpha bit set are returned to SM 1840 even if traversal has not completed. The returned traversal stack contains the state required to continue traversal if software determines that the triangle was in fact transparent.
    (3) Triangle intersection in some embodiments is not supported for beams, so encountered triangle ranges are by default returned to SM 1840 as a "TriRange" hit type, which includes a pointer to the first triangle block overlapping the range, parameters specifying the range, and the t-value of the intersection with the leaf bounding box.
  An item range, consisting of an index (derived from a user-provided "item range base" stored in the complet) and a count of items.
    By default, item ranges are returned to SM 1840 as an "ItemRange" hit type, consisting of for example an index, a count, and the t-value of the intersection with the leaf bounding box.
  An instance node.
    The TTU 138 in some embodiments can handle one level of instancing natively by transforming the ray into the coordinate system of the instance BVH. Additional levels of instancing (or every other level of instancing, depending on strategy) may be handled in software (or in other embodiments, the TTU 138 hardware can handle two, three or more levels of instancing). The "InstanceNode" hit type is provided for this purpose, consisting of a pointer to the instance node and the tvalue of the intersection with the leaf bounding box. In other implementations, the hardware can handle two, three or more levels of instancing.

In addition to the node-specific hit types, a generic "NodeRef" hit type is provided that consists of a pointer to the parent complet itself, as well as an ID indicating which child was intersected and the t-value of the intersection with the bounding box of that child.

An "Error" hit type may be provided for cases where the query or BVH was improperly formed or if traversal encountered issues during traversal.

A "None" hit type may be provided for the case where the ray or beam misses all geometry in the scene.

How the TTU handles each of the four possible node types is determined by a set of node-specific mode flags set as part of the query for a given ray. The "default" behavior mentioned above corresponds to the case where the mode flags are set to all zeroes.

Alternative values for the flags allow for culling all nodes of a given type, returning nodes of a given type to SM as a NodeRef hit type, or returning triangle ranges or instance nodes to SM using their corresponding hit types, rather than processing them natively within the TTU 138.

Additional mode flags may be provided for control handling of alpha triangles.

Applications for the technology herein include ray tracing, collision detection, object detection, and other applications.

All patents & publications cited above are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of building an acceleration structure performed by at least one processor, comprising:
   determining that orienting a bounding volume in a different coordinate space will more closely fit geometry; and
   storing, in association with the geometry, parameters of a transform configured for use in transforming at least one ray to be tested for intersection against the oriented bounding volume in an intersection coordinate system, thereby equivalently transforming the bounding volume so it becomes axis-aligned in the intersection coordinate system,
   wherein the storing comprises storing the parameters in a complet defining a plurality of objects, and the parameters are configured to apply locally to the complet.

2. The method of claim 1 wherein the different coordinate space comprises a shear space, and the transform comprises an inverse shear transform.

3. The method of claim 1 wherein determining includes selecting the transform from a constrained quantized list.

4. The method of claim 1 wherein the transform is constrained to be one-dimensional.

5. The method of claim 1 wherein the transform is constrained to be two-dimensional with only two coefficients.

6. The method of claim 1 wherein the stored parameters comprise an index into a list of quantized transforms.

7. The method of claim 1 wherein the stored parameters comprise a selector configured to select between power-of-two coefficients.

8. A ray tracer configured to perform, with hardware circuitry, operations comprising:
   receiving a specification of a bounding volume;
   receiving parameters that define a transform associated with the bounding volume;
   receiving a specification of a ray;
   transforming the ray using the defined transform, thereby equivalently transforming the bounding volume so it becomes axis-aligned; and
   testing whether the transformed ray intersects the axis-aligned bounding volume,
   wherein the hardware circuitry comprises a hardware calculator configured to transform the ray, the hardware calculator configured to derive a reciprocal of the transformed ray for intersection testing.

9. The ray tracer of claim 8 wherein the received parameters define an inverse shear transform.

10. The ray tracer of claim 8 wherein the received parameters select between power-of-two coefficients.

11. The ray tracer of claim 8 wherein the received parameters constrain the transform to a single axis transform or a two-axis transform requiring at most two coefficients.

12. The ray tracer of claim 8 wherein the hardware calculator comprises integer exponent adders and a further adder.

13. The ray tracer of claim 12 wherein the further adder comprises a floating point adder.

14. The ray tracer of claim 8 wherein the hardware calculator is further configured to transform the origin and direction of the ray.

15. The ray tracer of claim 8 wherein:
   the ray tracer is further configured to receive the parameters that define a transform associated with the bounding volume within a complet that defines or is associated with geometry; and
   the ray tracer is further configured to apply the transformed ray to the geometry defined or associated with the complet and then discard the transformed ray.

16. A ray tracer configured to perform, with hardware circuitry, operations comprising:
   receiving a specification of a bounding volume;
   receiving parameters that define a shear transform associated with the bounding volume;
   receiving a specification of a ray;
   applying the shear transform to the bounding volume or the ray; and
   testing, along axes within shear space, whether the ray intersects the bounding volume,
   wherein the hardware circuitry comprises a hardware transform calculator comprising hardware that derives a reciprocal for intersection testing.

17. The ray tracer of claim 16 wherein the applying is configured to apply the shear transform to the ray.

18. The ray tracer of claim 16 wherein the received parameters define an inverse shear transform.

19. The ray tracer of claim 16 wherein the received parameters select between power-of-two coefficients.

20. The ray tracer of claim 16 wherein the received parameters constrain the transform to a single axis transform or a two-axis transform requiring at most two coefficients.

21. The ray tracer of claim 16 wherein the hardware transform calculator comprises integer exponent adders and a further adder.

22. The ray tracer of claim 21 wherein the further adder comprises a floating point adder.

23. The ray tracer of claim 16 wherein the hardware transform calculator is further configured to transform the origin and direction of the ray.

24. A ray tracer configured to perform, with hardware circuitry, operations comprising:
   receiving a specification of a bounding volume;
   receiving parameters that define a shear transform associated with the bounding volume;
   receiving a specification of a ray;
   applying the shear transform to the bounding volume or the ray; and
   testing, along axes within shear space, whether the ray intersects the bounding volume;
   wherein the ray tracer is further configured to receive the parameters that define a transform associated with the bounding volume within a complet that defines or is associated with geometry; and
   the ray tracer is further configured to discard results of the transform after processing the geometry the complet defines or is associated with.

25. A ray tracer comprising:
   first hardware circuitry configured to transform a ray using a first transform and test for intersection against an axis-aligned bounding volume enclosing geometry; and
   second hardware circuitry configured to, in response to the first hardware circuitry detecting an intersection, transform the ray using a second transform different from the first transform and test for intersection against the geometry;
   wherein the first transform comprises an inverse shear transform and the first hardware circuitry comprises a hardware transform calculator comprising hardware that derives a reciprocal for intersection testing.

26. A hardware based ray tracing method with improve efficiency of bounding volumes, the method comprising:
receiving bounds of an axis-aligned bounding box sheared to fit around enclosed oriented geometry in top level or bottom level space, the sheared axis-aligned bounding box approximating an oriented bounding box typically defined by rotations;
receiving parameters derived from or representing an inverse of a shear transform;
using the received parameters to transform a ray into a sheared coordinate system including:
constraining the number of shear dimensions,
constraining the shear transform coefficients to a quantized list,
sharing a shear transform across a collection of bounds,
performing a shear transform only for ray-bounds testing and not for ray-geometry intersection testing, and
performing the using with a specialized shear transform calculator/accelerator circuit; and
testing the transformed ray in the sheared coordinate system for intersection with the sheared axis-aligned bounding boxes.

* * * * *